US012039074B2

(12) United States Patent
Muffat et al.

(10) Patent No.: US 12,039,074 B2
(45) Date of Patent: Jul. 16, 2024

(54) METHODS, PERSONAL DATA ANALYSIS SYSTEM FOR SENSITIVE PERSONAL INFORMATION DETECTION, LINKING AND PURPOSES OF PERSONAL DATA USAGE PREDICTION

(71) Applicant: Dathena Science Pte Ltd, Singapore (SG)

(72) Inventors: Christopher Muffat, Singapore (SG); Tetiana Kodliuk, Singapore (SG)

(73) Assignee: Dathena Science Pte Ltd, Singapore (SG)

( * ) Notice: Subject to any disclaimer, the term of this patent is extended or adjusted under 35 U.S.C. 154(b) by 239 days.

(21) Appl. No.: 16/731,351

(22) Filed: Dec. 31, 2019

(65) Prior Publication Data

US 2020/0250139 A1    Aug. 6, 2020

(30) Foreign Application Priority Data

Dec. 31, 2018 (SG) .......................... 10201811833W

(51) Int. Cl.
*G06F 16/182* (2019.01)
*G06F 16/14* (2019.01)
(Continued)

(52) U.S. Cl.
CPC ........ *G06F 21/6245* (2013.01); *G06F 16/148* (2019.01); *G06F 16/156* (2019.01);
(Continued)

(58) Field of Classification Search
CPC .... G06F 16/148; G06F 16/182; G06F 16/164; G06F 16/156; G06F 21/6245; G06N 20/00; G06K 9/6264
(Continued)

(56) References Cited

U.S. PATENT DOCUMENTS

2014/0201111 A1* 7/2014 Kasravi ................. G06N 3/084
706/12
2014/0297644 A1* 10/2014 Cheng .................... G06N 5/022
707/737
(Continued)

FOREIGN PATENT DOCUMENTS

CN        105760495 A     7/2016

OTHER PUBLICATIONS

Gary Marcus, "Deep Learning: A Critical Appraisal", Jan. 2, 2018 (Year: 2018).*

(Continued)

*Primary Examiner* — Hosain T Alam
*Assistant Examiner* — Robert F May
(74) *Attorney, Agent, or Firm* — Harness, Dickey & Pierce, PLC

(57) ABSTRACT

Systems and methods for personal data classification, linkage and purpose of processing prediction are provided. The system for personal data classification includes an entity extraction module for extracting personal data from one or more data repositories in a computer network or cloud infrastructure, a linkage module coupled to the entity extraction module, a linkage module coupled to the entity extraction module and a processing prediction module. The entity extraction module performs entity recognition from the structured, semi-structured and unstructured records in the one or more data repositories. The linkage module uses graph-based methodology to link the personal data to one or more individuals. And the purpose prediction module includes a feature extraction module a purpose of processing prediction module, wherein the feature extraction module extracts both context features and record's features from records in the one or more data repositories, and the purpose (Continued)

of processing prediction module predicts a unique or multiple purpose of processing of the personal data.

9 Claims, 22 Drawing Sheets

(51) Int. Cl.
    *G06F 16/16*         (2019.01)
    *G06F 18/21*         (2023.01)
    *G06F 21/62*         (2013.01)
    *G06N 20/00*        (2019.01)
    *G06V 10/82*        (2022.01)
    *G06V 30/196*      (2022.01)
    *G06V 30/262*      (2022.01)
    *G06V 30/412*      (2022.01)

(52) U.S. Cl.
    CPC .......... *G06F 16/164* (2019.01); *G06F 16/182* (2019.01); *G06F 18/2185* (2023.01); *G06N 20/00* (2019.01); *G06V 10/82* (2022.01); *G06V 30/1988* (2022.01); *G06V 30/274* (2022.01); *G06V 30/412* (2022.01)

(58) Field of Classification Search
    USPC .......................................................... 707/722
    See application file for complete search history.

(56) References Cited

U.S. PATENT DOCUMENTS

| | | | |
|---|---|---|---|
| 2017/0097984 A1* | 4/2017 | Haldar | G06F 16/288 |
| 2018/0039647 A1 | 2/2018 | Winstanley et al. | |
| 2018/0082183 A1* | 3/2018 | Hertz | G06Q 10/10 |
| 2018/0246973 A1* | 8/2018 | Zhao | G06F 16/9535 |
| 2019/0164015 A1* | 5/2019 | Jones, Jr. | G06N 5/022 |
| 2020/0065857 A1* | 2/2020 | Lagi | G06Q 30/0254 |
| 2020/0184210 A1* | 6/2020 | Malabarba | G06V 10/426 |

OTHER PUBLICATIONS

Jurgen Schmidhuber, "Deep Learning in Neural Networks: An Overview", Apr. 30, 2014 (Year: 2014).*

Search Report and Written Opinion from the Intellectual Property Office of Singapore regarding Application No. 10201914133S, dated May 2, 2023 (16 Pages).

* cited by examiner

PII Linking

- Goal: For each pair of entities find the relationship that link them.

```
"name": "DATHENA Cash Account",
"regex": "\\b(?i)(0(\\d){3}[-\\.\\:\\; ]*([0-9A-Z]{2}(\\d){6}.([0-9A-Z]){2}[A-Z]))\\b"

"name": "DATHENA Portfolio Id",
"regex": "\\b(?i)(0(\\d){3}[-\\.\\:\\; ]*([0-9A-Z]){2}(\\d){6}.(\\d){4})\\b"

"name": "DATHENA Custody Account",
"regex": "\\b(?i)(0(\\d){3}[-\\.\\:\\; ]*([0-9A-Z]){2}(\\d){6}.([A-Z][0-9]|[0-9]))\\b"

"name": "DATHENA Client Relationship",
"regex": "\\b(?i)(0(\\d){3}[-\\.\\:\\; ]*([0-9A-Z]){2}(\\d){6})\\b"
```

*FIG. 9*    900

```
WordWithIndex(I, Range 0 to 1)       -> <proper_noun>
WordWithIndex(Mr, Range 5 to 7)      -> <proper_noun>
WordWithIndex(Tree, Range 9 to 13)   -> <proper_noun>
WordWithIndex(Mr, Range 5 to 7)      -> <uppercase_company_name>
WordWithIndex(Tree, Range 9 to 13)   -> <uppercase_company_name>
WordWithIndex(Tree, Range 9 to 13)   -> <first_name>
WordWithIndex(Tree, Range 9 to 13)   -> <last_name>
WordWithIndex(Mr, Range 5 to 7)      -> <title>
WordWithIndex(I, Range 0 to 1)       -> STOPWORD
WordWithIndex(am, Range 2 to 4)      -> STOPWORD
WordWithIndex(Mr, Range 5 to 7)      -> STOPWORD
WordWithIndex(I am, Range 0 to 4)    -> HINT_<PROPER_NOUN>
WordWithIndex(I am, Range 0 to 4)    -> HINT_<FIRST_NAME>
WordWithIndex(I am, Range 0 to 4)    -> HINT_<LAST_NAME>
WordWithIndex(I am, Range 0 to 4)    -> HINT_<TITLE>
WordWithIndex(I, Range 0 to 1)       -> POS_PRP
WordWithIndex(am, Range 2 to 4)      -> POS_VBP
WordWithIndex(Mr., Range 5 to 8)     -> POS_NNP
WordWithIndex(Tree, Range 9 to 13)   -> POS_NNP
```

*FIG. 10*    1000

```
WordWithIndex(I,Range 0 to 1)      -> [<proper_noun>, POS_PRP, STOPWORD]
WordWithIndex(Mr,Range 5 to 7)     -> [<proper_noun>,
<uppercase_company_name>, <title>, STOPWORD]
WordWithIndex(Tree,Range 9 to 13)  -> [<proper_noun>,
<uppercase_company_name>, <first_name>, <last_name>, POS_NNP]
WordWithIndex(am,Range 2 to 4)     -> [STOPWORD, POS_VBP]
WordWithIndex(I am,Range 0 to 4)   -> [HINT_<PROPER_NOUN>,
HINT_<FIRST_NAME>, HINT_<LAST_NAME>, HINT_<TITLE>]
WordWithIndex(Mr.,Range 5 to 8)    -> [POS_NNP]
```

```
WordWithIndex(I,Range 0 to 1)      -> [[<proper_noun>,
0.1560000000000003], [STOPWORD, 1.0], [POS_PRP, 1.0]]
WordWithIndex(am,Range 2 to 4)     -> [[STOPWORD, 1.0], [POS_VBP, 1.0]]
WordWithIndex(Tree,Range 8 to 12)  -> [[<proper_noun>, 0.815680000000001],
[<uppercase_company_name>, 0.43999999999999995], [<first_name>, 0.9475],
[<last_name>, 0.9475], [POS_NNP, 1.0]]
WordWithIndex(I am,Range 0 to 4)   -> [[HINT_<PROPER_NOUN>, 1.0],
[HINT_<FIRST_NAME>, 1.0], [HINT_<LAST_NAME>, 1.0], [HINT_<TITLE>, 1.0]]
WordWithIndex(Mr,Range 5 to 7)     -> [[<proper_noun>, 0.51080],
[<uppercase_company_name>, 0.132], [<title>, 0.925], [STOPWORD, 1.0],
[POS_NNP, 1.0]]
```

```
WordWithIndex(I,Range 0 to 1)    -> [[<proper_noun>,
0.1560000000000003], [STOPWORD, 1.0], [POS_PRP, 1.0]]
WordWithIndex(am,Range 2 to 4)   -> [[STOPWORD, 1.0], [POS_VBP, 1.0]]
WordWithIndex(Tree,Range 8 to 12) -> [[<proper_noun>, 0.615680000000001],
[<uppercase_company_name>, 0.43999999999995], [<first_name>, 0.9475],
[<last_name>, 0.9475], [POS_NNP, 1.0]]
WordWithIndex(I am,Range 0 to 4)  -> [[HINT_<PROPER_NOUN>, 1.0],
[HINT_<FIRST_NAME>, 1.0], [HINT_<LAST_NAME>, 1.0], [HINT_<TITLE>, 1.0]]
WordWithIndex(Mr,Range 5 to 7)   -> [[<proper_noun>, 0.51068],
[<uppercase_company_name>, 0.132], [<title>, 0.925], [STOPWORD, 1.0],
[POS_NNP, 1.0]]
```

```
WordWithIndex(I,Range 0 to 1)    -> [WordWithIndex(am,Range 2 to 4)]
WordWithIndex(am,Range 2 to 4)   -> [WordWithIndex(Mr,Range 5 to 7)]
WordWithIndex(I am,Range 0 to 4) -> [WordWithIndex(Mr,Range 5 to 7)]
WordWithIndex(Mr,Range 5 to 7)   -> [WordWithIndex(Tree,Range 8 to 12)]
```

```
WordWithIndex(Mr Tree,Range 5 to 12) -> [<fullname>, 0.774325]
WordWithIndex(Mr Tree,Range 5 to 12) -> [<fullname>, 0.774325]
WordWithIndex(Mr Tree,Range 5 to 12) -> [<fullname>, 0.7194]
WordWithIndex(Mr Tree,Range 5 to 12) -> [<title_lastname>, 0.891950000000001]
WordWithIndex(Mr Tree,Range 5 to 12) -> [<title_lastname>, 0.946875]
WordWithIndex(Mr Tree,Range 5 to 12) -> [<title_lastname>, 0.946875]
WordWithIndex(Mr Tree,Range 5 to 12) -> [<company_name>, 0.40499999999997]
```

```
WordWithIndex(4587,Range 52 to 56) -> [POS_CD, 1.0]
WordWithIndex(Smith,Range 18 to 23) -> [<proper_noun>, 0.6928],
[<uppercase_company_name>, 0.43999999999999995], [<first_name>, 0.895],
[<last_name>, 0.895], [POS_NNP, 1.0]
WordWithIndex(is,Range 8 to 10) -> [STOPWORD, 1.0], [CITY, 1.0], [POS_VBZ, 1.0]
WordWithIndex(number,Range 37 to 43) -> [STOPWORD, 1.0], [HINT_<PHONE_NO>,
1.0], [HINT_<CREDIT_CARD>, 1.0], [HINT_<CREDIT_CARD>, 1.0],
[HINT_<CREDIT_CARD>, 1.0], [HINT_<CREDIT_CARD>, 1.0], [HINT_<CREDIT_CARD>,
1.0], [HINT_<CREDIT_CARD>, 1.0], [HINT_<CREDIT_CARD>, 1.0],
[HINT_<CREDIT_CARD>, 1.0], [HINT_<CREDIT_CARD>, 1.0], [HINT_<CREDIT_CARD>,
1.0], [HINT_<CREDIT_CARD>, 1.0], [HINT_<CREDIT_CARD>, 1.0],
[HINT_<CREDIT_CARD>, 1.0], [HINT_<CREDIT_CARD>, 1.0], [HINT_<CREDIT_CARD>, 1.0]
[HINT_<CREDIT_CARD>, 1.0], [HINT_<CREDIT_CARD>, 1.0], [HINT_<CREDIT_CARD>, 1.0],
[HINT_<CREDIT_CARD>, 1.0], [HINT_<CREDIT_CARD>, 1.0], [HINT_<CREDIT_CARD>,
1.0], [HINT_<CREDIT_CARD>, 1.0], [HINT_<CREDIT_CARD>, 1.0], [HINT_<PHONE_NO>,
1.0], [HINT_<PHONE_NO>, 1.0], [HINT_<PHONE_NO>, 1.0], [HINT_<PHONE_NO>, 1.0],
[HINT_<PHONE_NO>, 1.0], [HINT_<PHONE_NO>, 1.0], [HINT_<PHONE_NO>, 1.0],
[POS_NN, 1.0]
WordWithIndex(Davide Smith,Range 11 to 23) -> [<fullname>, 0.82825],
[<fullname>, 0.9125], [<fullname>, 0.9125], [<fullname>, 0.82825], [<fullname>,
0.744], [<fullname>, 0.82825], [<fullname>, 0.9125], [<fullname>, 0.9125],
[<fullname>, 0.82825], [<company_name>, 0.5333333333333333]
WordWithIndex(phone,Range 31 to 36) -> [HINT_<PHONE_NO>, 1.0],
[HINT_<PHONE_NO>, 1.0], [HINT_<PHONE_NO>, 1.0], [HINT_<PHONE_NO>, 1.0],
[HINT_<PHONE_NO>, 1.0], [HINT_<PHONE_NO>, 1.0], [HINT_<PHONE_NO>, 1.0],
[HINT_<PHONE_NO>, 1.0], [POS_NN, 1.0]
WordWithIndex(is,Range 44 to 46) -> [STOPWORD, 1.0], [CITY, 1.0], [POS_VBZ,
1.0]
WordWithIndex(My,Range 0 to 2) -> [<proper_noun>, 0.15600000000000003],
[<uppercase_company_name>, 0.09000000000000001], [STOPWORD, 1.0], [POS_PRP$,
1.0]
WordWithIndex(and,Range 24 to 27) -> [STOPWORD, 1.0], [POS_CC, 1.0]
WordWithIndex(Davide,Range 11 to 17) -> [<proper_noun>, 0.6928],
[<uppercase_company_name>, 0.43999999999999995], [<first_name>, 0.895],
[<last_name>, 0.895], [POS_NNP, 1.0]
WordWithIndex(6741 4587,Range 47 to 56) -> [<phone_no>, 0.7]
WordWithIndex(my,Range 28 to 30) -> [STOPWORD, 1.0], [POS_PRP$, 1.0]
WordWithIndex(name,Range 3 to 7) -> [STOPWORD, 1.0], [HINT_<PROPER_NOUN>, 1.0],
[HINT_<FIRST_NAME>, 1.0], [HINT_<LAST_NAME>, 1.0], [HINT_<TITLE>, 1.0],
[POS_NN, 1.0]
WordWithIndex(6741,Range 47 to 51) -> [POS_CD, 1.0]
```

```
WordWithIndex(Davide Smith,Range 11 to 23) -> [<fullname>, 0.9125]
WordWithIndex(6741 4587,Range 47 to 56) -> [<phone_no>, 0.7]
WordWithIndex(Smith,Range 18 to 23) -> [<first_name>, 0.895]
WordWithIndex(Davide,Range 11 to 17) -> [<first_name>, 0.895]
WordWithIndex(My,Range 0 to 2) -> [<proper_noun>, 0.1560000000000003]
```

FIG. 14B  1420

```
WordWithIndex(Davide Smith,Range 11 to 23) -> [<fullname>, 0.9125]
WordWithIndex(6741 4587,Range 47 to 56) -> [<phone_no>, 0.7]
WordWithIndex(Smith,Range 18 to 23) -> [<first_name>, 0.895]
WordWithIndex(Davide,Range 11 to 17) -> [<first_name>, 0.895]
```

```
WordWithIndex(Davide Smith,Range 11 to 23) -> 0.9542483660130718
WordWithIndex(6741 4587,Range 47 to 56) -> 0.7329942931937172
WordWithIndex(Smith,Range 18 to 23) -> 0.6090161610433796
WordWithIndex(Davide,Range 11 to 17) -> 0.6723966627314193
```

FIG. 14D  1460

```
WordWithIndex(6741 4587,Range 47 to 56) -> [<phone_no>, 0.7]
WordWithIndex(Davide Smith,Range 11 to 23) -> [<fullname>, 0.9125]
```

FIG. 14E  1480

1502 — Input: Hello my name is John Smith and I work at Dathena located at 1st George Street, Singapore.
1504 — Output: Hello my name is <fullname> and I work at <company_name> located at <address>.

METHODS, PERSONAL DATA ANALYSIS SYSTEM FOR SENSITIVE PERSONAL INFORMATION DETECTION, LINKING AND PURPOSES OF PERSONAL DATA USAGE PREDICTION

PRIORITY CLAIM

This application claims priority from Singapore Patent Application No. 10201811833W filed on 31 Dec. 2018.

TECHNICAL FIELD

The present invention relates generally to data manipulation, storage and management, and more particularly relates to deep learning, machine learning methods and text summarization techniques for personal data detection, extraction, linking, protection and management.

BACKGROUND OF THE DISCLOSURE

Privacy is becoming one of the highest concerns in the public sphere. New regulations in effect or coming into effect in Europe (General Data Protection Regulation (GDPR)), US (on a federal basis), Brazil (General Data Protection Law), Singapore (Personal Data Protection Act) and other countries, set standards for data protection and privacy for an individual's personal information. Such personal information is sensitive and may include name, date of birth, address, identification number, issue date and information, and extraction of such personal information needs to be accurate for regulation compliance. Compliance with such regulations is challenging in today's data-driven world where companies have documents containing such sensitive personal information stored. In order to comply with these international privacy regulations, companies need to have clear knowledge of the personal data they hold, which means for most companies, they must have a way to link subjects of processing (i.e., persons or organizations) with personal data such as credit card numbers, addresses and other personal information.

Traditional security and privacy techniques are overstretched, and adversarial actors have evolved to design exploitation techniques that circumvent protection. As per the GDPR, an organisation can be fined up to 10 million euros or two percent of the firm's global turnover for a small offence. For a serious offence, an organisation can be fined up to 20 million euros or four percent of a firm's global turnover.

Thus, there is a need for data protection methods and systems for extraction of personal data entities (entity recognition), their classification (entity classification), linking and purpose of the processing definition which is able to address the above-mentioned challenges in meeting personal data protection and privacy regulations and provide further advantages in terms of data management of sensitive personal data. Furthermore, other desirable features and characteristics will become apparent from the subsequent detailed description and the appended claims, taken in conjunction with the accompanying drawings and this background of the disclosure.

SUMMARY

According to at least one embodiment of the present invention, a system for personal data classification is provided. The system for personal data classification includes an entity extraction module for extracting personal data from one or more data repositories in a computer network or cloud infrastructure, a linkage module coupled to the entity extraction module, a linkage module coupled to the entity extraction module and a processing prediction module. The entity extraction module performs entity recognition from the structured, semi-structured and unstructured records in the one or more data repositories. The linkage module uses graph-based methodology to link the personal data to one or more individuals. And the purpose prediction module includes a feature extraction module a purpose of processing prediction module, wherein the feature extraction module extracts both context features and record's features from records in the one or more data repositories, and the purpose of processing prediction module predicts a unique or multiple purpose of processing of the personal data.

According to another embodiment of the present invention, a method for personal data extraction is provided. The method for personal data extraction includes scanning one or more documents in one or more data repositories in a computer network or cloud infrastructure, the one or more documents comprising structured, semi-structured or unstructured documents and performing entity recognition in the structured, semi-structured and unstructured documents. The method further includes extracting features from the structured, semi-structured and unstructured documents using deep learning and deterministic learning methodologies.

In accordance with further embodiment of the present invention, a method for personal data extraction is provided. The method for personal data linking includes supervised and unsupervised machine learning model training for identifying relationships between personal data entities and calculating a probability of a linking of the personal data entities form the identified relationships.

In accordance with yet a further embodiment of the present invention, a method for personal data processing prediction is provided. The method for personal data processing prediction includes unsupervised auto-labelling of personal data from documents in one or more data repositories in a computer network or cloud infrastructure, wherein the unsupervised auto-labelling reuses a text summarization methodology and includes key-phrase aggregation and linking techniques to predict a purpose of processing topic for the personal data.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 2, comprising FIGS. 2A and 2B, depicts exemplary illustrations of use cases and goals for personal data extraction and linking in accordance with the present embodiments, wherein FIG. 2A depicts exemplary illustrations for two use cases for personal data extraction in accordance with the present embodiments and FIG. 2B depicts an exemplary illustration for a goal for personal data linking in accordance with the present embodiments.

FIG. 9 depicts a table of regex definitions for the resources of the PII extraction methodology of FIG. 7 in accordance with an aspect of the present embodiments.

FIG. 10 depicts a table listing regex matching by the RegexMatcher module of FIG. 8 in accordance with an aspect of the present embodiments.

FIG. 11 depicts a table showing word grouping by the RegexMatcher module of FIG. 8 in accordance with an aspect of the present embodiments.

FIG. 12 depicts a table of categorization in accordance with rules by the ConfidenceCalculator module of FIG. 8 in accordance with an aspect of the present embodiments.

FIG. 13, comprising FIGS. 13A, 13B and 13C, depicts tables of categorized entities at various steps in the operation of the TagMatcher module of FIG. 8 in accordance with an aspect of the present embodiments, wherein FIG. 13A depicts a table of categorized entities as input to the TagMatcher module, FIG. 13A depicts a table of a word graph of categorized entities built by the TagMatcher module, and FIG. 13C depicts a table of matched entities where patterns of tags are used to match the entities.

FIG. 14, comprising FIGS. 14A to 14E, depicts tables at various steps of selection of personal identification informations (PIIS) by the PII selector module of FIG. 8 in accordance with an aspect of the present embodiments, wherein FIG. 14A depicts a table of PIIS from the TagMatcher module, FIG. 14B depicts a table of selection of the PIIS which have the highest confidence score, FIG. 14C depicts a table of filtering out of matches below a predefined threshold, FIG. 14D depicts a table of decisions of overlapping PIIS, and FIG. 14E depicts a selection of one of the overlapping PIIs.

FIG. 15 depicts a table of input to and output from the pipeline of operational modules of FIG. 8 in accordance with an aspect of the present embodiments.

FIG. 19, comprising FIGS. 19A and 19B, depicts confusion matrices for F1 scoring when performing methodologies in accordance with the present embodiments on sentences in the German language, wherein FIG. 19A depicts F1 scoring when the PIIS include a special category and FIG. 19B depicts F1 scoring when the PIIS do not include a special category.

FIG. 20, comprising FIGS. 20A and 20B, depicts confusion matrices for F1 scoring when performing methodologies in accordance with the present embodiments on sentences in the English language, wherein FIG. 20A depicts F1 scoring when the PIIS include a special category and FIG. 20B depicts F1 scoring when the PIIS do not include a special category.

FIG. 21, comprising FIGS. 21A, 21B and 21C, depicts bar graphs illustrating average prediction metrics for each field when performing methodologies in accordance with the present embodiments on sentences, wherein FIG. 21A depicts average Recall metrics for fields in the English language, FIG. 21B depicts average F1 score metrics for fields in the English language, and FIG. 21C depicts average Recall metrics for fields in the German language.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiments to present a method for personal data extraction which includes scanning one or more documents in one or more network data repositories of a computer network or repository on cloud and entity recognition from the structured, semi-structured and unstructured documents stored therein. Deep learning and deterministic learning methodologies are used to extract more than fifty entity types and further categorization of the extracted personal data. A method for personal data linking is also provided, the personal data linking method further including supervised and unsupervised machine learning model training for identifying relationships between personal data entities and calculate a probability of their linking. Further, a method for personal data processing prediction is provided which is based on unsupervised auto-labelling reusing a text summarization methodology and including key-phrase aggregation and linking techniques to predict a purpose topic.

While artificial intelligence is seen as a potential solution towards the cybersecurity automation challenge, the big challenge is in personal data extraction from unstructured and structured documents and databases, validation of the personal data and linking the personal data to the subject of processing (i.e., the person or the organization). Based on identified personal information, systems and methods in accordance with present embodiments tags the documents with sensitivity and risk labels and is able to predict anomalies related to data sensitivity and access rights.

In addition, each data processing activity relating to personal data has one or more purposes. Different data processing activities can share a single purpose and the methods and systems in accordance with the present embodiments are designed to predict the purpose of the personal data processing through document topic and personal data distribution analysis.

Figure 1:
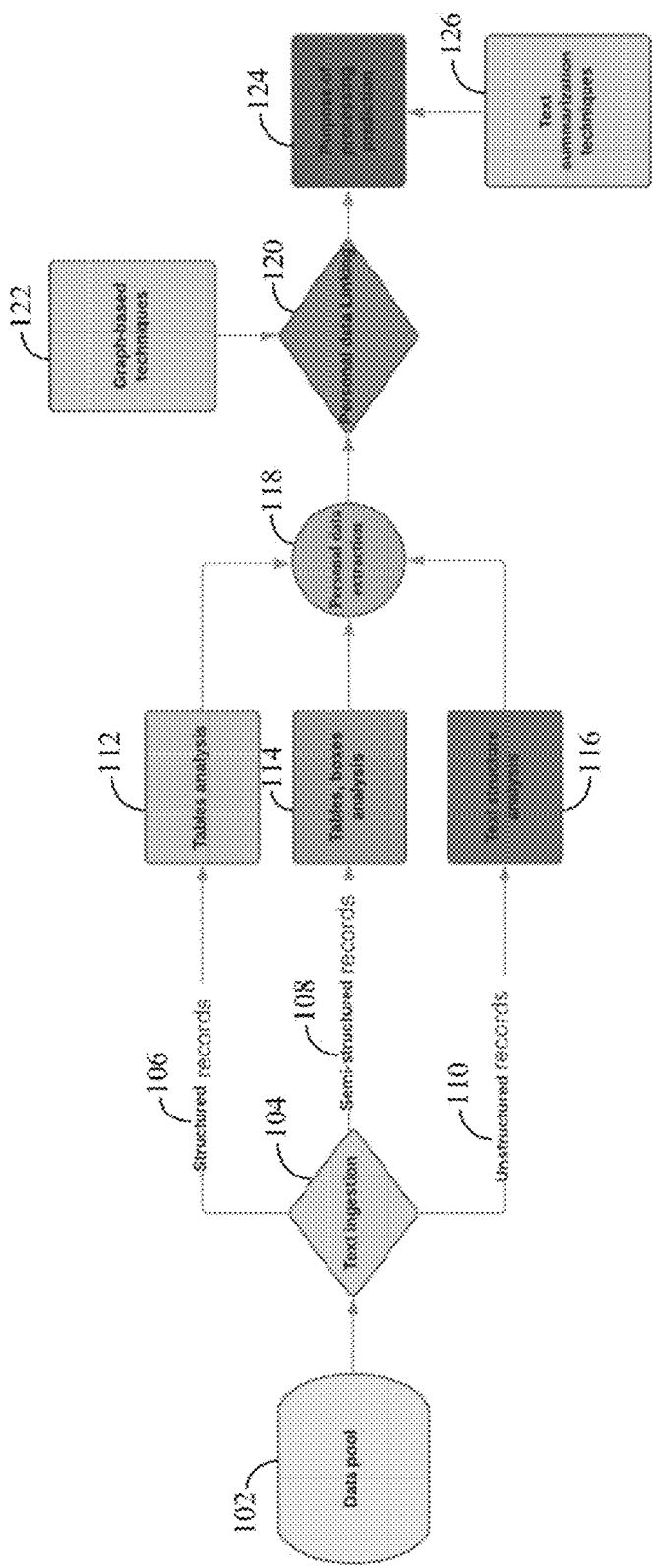
FIG. 1 depicts a flow diagram for personal data extraction and linking in accordance with present embodiments.

Referring to FIG. 1, a flow diagram 100 depicts a system which utilizes artificial intelligence for personal data extraction and linking in accordance with present embodiments.

The data resides in records in a data pool 102. A text ingestion process 104 distinguishes the records or documents between structured records 106 where the data is in tabular or other structured form, semi-structured records 108 which includes structured elements and unstructured elements, and unstructured records 110.

A structured table is a list of rows that share the same set of named columns such as an Excel spreadsheet. On the other hand, unstructured text is a list sentences without any specific structure. Articles are mostly composed of unstructured text. An unstructured record 110 is a document that only contains unstructured text. A structured record 106 is a document that only includes structured tables. A semi-structured record 108 contains both structured and unstructured elements. For example, a ".pdf" file that contains a table would be a semi-structured record 108.

Table analysis 112 is performed on the structured records 106, table and box analysis 114 is performed on the semi-structured records 108, and text structure analysis 116 is performed on the unstructured records 110. The results of the table analysis 112 of the structured records 106, of the table and box analysis 114 of the semi-structured records 108, and of the text structure analysis 116 of the unstructured records 110 are processed for personal data extraction 118 and personal data linking 120 in accordance with the present embodiments.

Graph-based techniques 122 are used for the personal data linking 120 (i.e., the problem of personal data linking in accordance with an aspect of the present embodiments is solved by graph-based approach building). After the personal data linking 120, a processing classification process 124 performs a purpose of processing prediction utilizing text summarization techniques 126, such as unsupervised text summarization techniques for keywords and keyphrases extraction based on their aggregation and linking to high-level topics.

Labelling the documents with a purpose of processing category when performing a purpose of processing prediction 126 is defined as which process inside a company justifies the extraction, usage, and processing of personal data contained inside a document and is closely linked to the European requirements of the GDPR. For example, an organization's human resources department which processes some CV from candidates only uses personal data in the context of employment. In this example, the purpose of processing category could be "human resources" if a general topic is desired, or "employment processing" if a more precise label is desired. Thus, it can be seen that the purpose of processing categories are target labels which, in accordance with the present embodiments, are mostly defined by the PIIS contained in the documents since the purpose of processing is mostly defined by the reasons to process the documents' personal data.

Personal data is closely linked to the purpose of processing. Also, Article 6 of the GDPR "Lawfulness of Processing" states that the purpose of processing shall be determined in regards to the legal basis set out therein and this was utilized to create labels in accordance with the present embodiments. The purpose of processing categories are the target labels and are mostly defined by the PIIS contained in the documents. Thus, it is necessary to define which features to choose from the documents to process them correctly.

One of the challenges of this clustering is to keep in mind the reason to cluster the documents and define all the steps and features for this reason. Defining the correct features for clustering is a crucial step for later results and, of course, for the sake of the automatic labeling. A first important feature is a document's meta-data. The type of document (extension) is an indicator of what the document could possibly be processed for and is, thus, used as a feature. Another extremely important attribute of a document is its language. Due to the nature of a target task, it is preferred to cluster a document separately as a function of their language, since this simplifies the process of auto labeling and identification of content in future tasks.

The type of a PII, such as Person, ID or Address, is defined as data types. For each document, the PIIS are extracted using one or more of several extraction processes. Neither TF-IDF nor embedding are used since the values are too sparse and do not make sense for clustering. Grouping them with a hierarchy could be an alternative, but requires some tweaking and careful handling. Thus, the frequency of each data type is used as a feature. The reasoning is that knowing the number of person or number of IBAN inside a document, for example, helps classify it. An illustration would be that a document containing a lot of persons and emails has a higher probability to be linked to human resources or marketing than to finance or security.

Another important metric is the combination of data types termed "toxicity". Certainly a document containing the name and IBAN of a person is more harmful than a document containing just the person name alone in terms of personal data and with respect to the GDPR. This toxicity is a threatening factor that can severely impact the real life of an individual. As it is linked to compliance and purpose of processing, it is included as a feature in document processing in accordance with the present embodiment. The toxicity coefficient is calculated for each document on a set of different rules.

As taking into account the frequency of each data type can be a pitfall if one value is repeated inside a document (e.g., the name of a company), another feature included in document processing in accordance with the present embodiment is the number of unique value of PII inside the document. Additionally, some statistics about the content of the document are calculated and used as features, such as a number of alphabetical character, a number of special characters, and a number of currency symbols. Finally, the role of a person inside a company who is an owner of a document is an important indicator of what purpose a document serves. Indeed, knowing the field or department an employee works in helps filter out some purposes when performing a purpose of processing prediction 126. For example, a document owned by an employee that belongs to the research department has a higher probability to be processed for a research purpose.

Figure 2A:
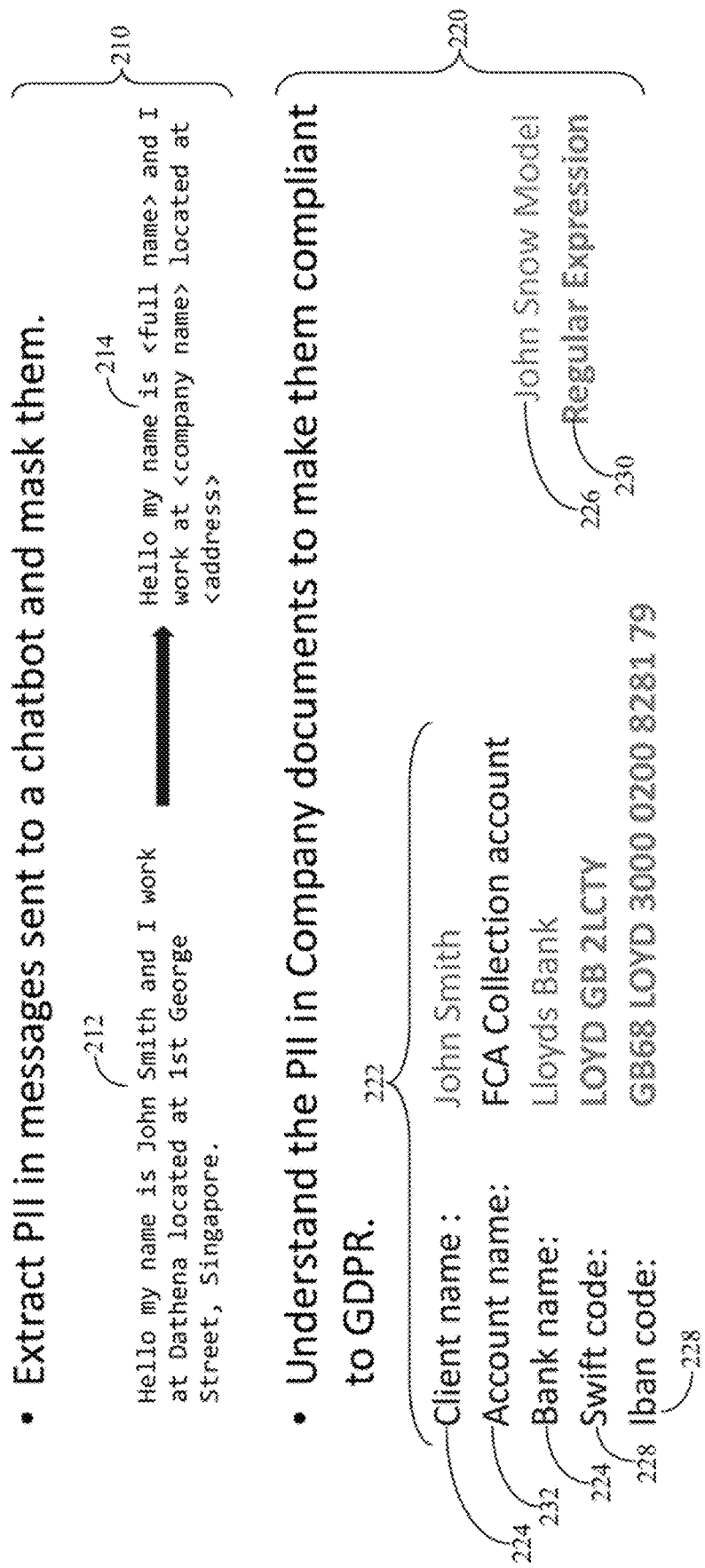

Referring to FIG. 2A, an illustration 200 depicts two exemplary illustration 210, 200 of personal extraction use cases in accordance with the present embodiments. A first use case is depicted in the illustration 210 where personal data (i.e., personal identity information (PII)) is extracted from messages where a message 212 is sent to a chatbot which extracts and masks the PII as shown in the revised message 214.

Another use-case, which is addressed within the personal data extraction module 118 (FIG. 1) is chatbot log processing and personal data masking as shown in the revised message 214. The resulting textual data can subsequently get transferred to a context where the personal data cannot be protected adequately. Organizations develop different types of systems which are aimed to identify personal data types in any type of data, extract and mask them to be compliant with the regulations. Although, there are many statistical and machine learning methods to solve this problem, they are still not accurate enough and are time consuming. Moreover, some of the algorithms are highly complicated and become "black boxes" for users as they cannot be maintained easily. Accordingly, the chatbot which extracts and masks the PII as shown in the revised message 214 as the revised message 214 masks the sensitive personal information in accordance with an aspect of the present embodiments wherein textual data can safely be transferred to other contexts.

In accordance with the present embodiments, a labelling engine has been developed to validate the entities extraction and linking. The document samples ingested by the text ingestion process 104 could be sent for the purpose of personal data processing validation. The personal data processing validation is a second use case depicted in the illustration 220 which ingests 104 documents maintained by a company or organization to understand and label PII for proper handling in compliance with laws and regulations such as the European Union's General Data Protection Regulation (GDPR). In the illustration 220, certain data 222 is labelled as name data 224 which are handled in accordance with a first predefined model 226, numerical or alphanumerical data 228 which is handled in accordance with a second predefined model 230, and other data 232.

Figure 2B:
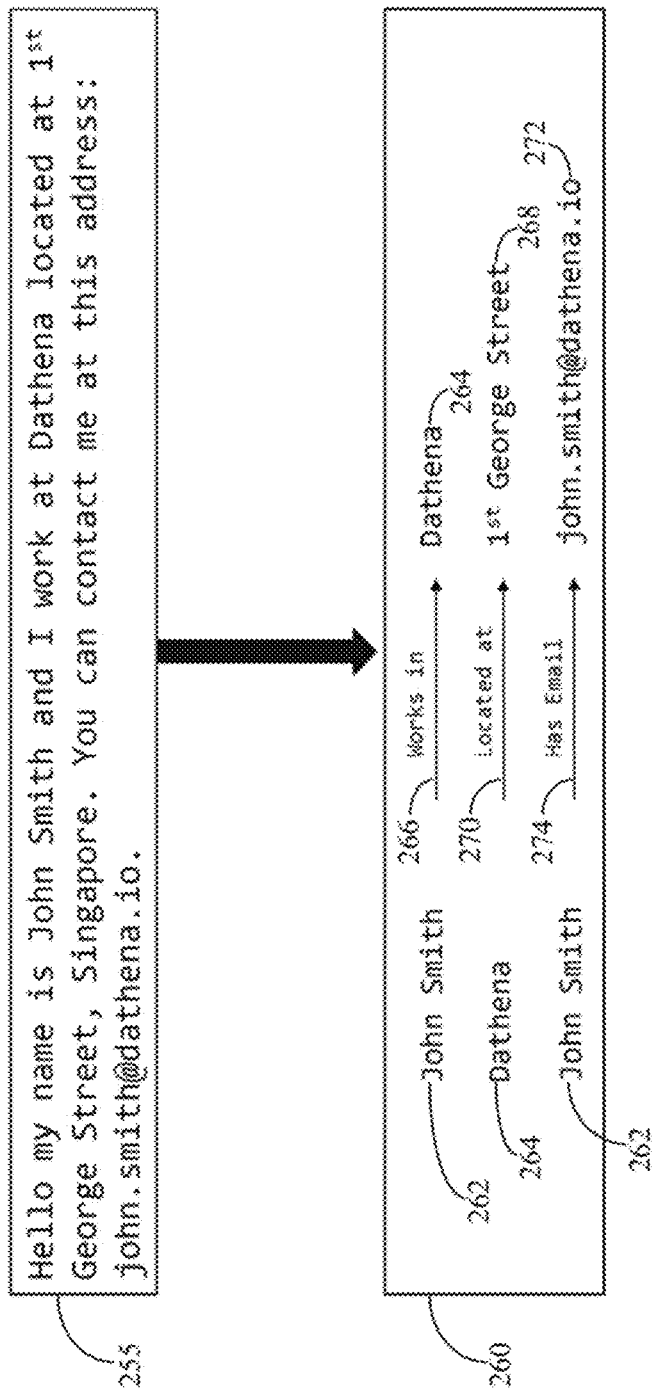

Referring to FIG. 2B, an exemplary illustration 250 depicts a goal for PII linking in accordance with the present embodiments which finds a relationship between each entity in a pair of entities that links the entities. As privacy is becoming of grave concern in the public sphere and in order to comply with international privacy regulations, companies need to have clear knowledge of the personal data they maintain which primarily includes what means exist in the data companies maintain that can link subjects of processing (e.g., a person, an organization) with other personal data such as credit card numbers, addresses and banking information. This is the use case addressed by the personal data linking module 120 (FIG. 1). After detecting the different PIIS in the data extraction module 118, the following step 120 links the extracted personal data together in order to track their relationships and store them in a database.

The module 120 is given a list of PIIS (personally identifiable information) such as credit cards or even organization names that were all collected from the previous module 118 (the personal data extraction module 118). These extracted PIIS were previously linked to the document they were found in and their position in said document. Using this information, the personal data linking module 120 is able to link the given PIIS together. The links between PIIS for one client is not transferable to another client, which is why client-specific information is used to build the linking model.

Therefore, a knowledge database (see FIG. 4 below) comprising relationships between entities can be built using information that can be easily extracted from certain documents. This knowledge is then leveraged as a training dataset for our PII linking deep learning models which will produce a tailored, repository-specific predictive model. This trained model is then used in accordance with the present embodiments to discover new relationships in the documents that were not extracted before and add them to the relational database. Both the knowledge database and the predictive model built can be applied to the aforementioned use case in order to provide the company with insights about their private data as well as help them comply with privacy regulations. Specifically, this use case is directly applicable to the European "right to be forgotten" data regulations. Being able to list out all linked information of a specific data subject enables companies to delete all the private data related to that subject in a blink.

In addition, the PIIS can be used as additional information to improve classification tools such as where it is desired to differentiate between files pertaining to a company's engineering department and their human resources department, knowing that a file contains a lot of relationships between people and their identity cards is valuable information in order to deduce that it belongs to the human resources department.

Referring to FIG. 2B, text 255 includes the sentences "Hello my name is John Smith and I work at Dathena located at $1^{st}$ George Street, Singapore. You can contact me at this address: john.smith@dathean.io." as an example of personal data that may be found in a document. The personal data linking process 120 links personal data as shown in PII linking 260. An identified PII "John Smith" 262 is linked with an identified PII "Dathena" 264 by linkage "works in" 266, the identified PII "Dathena" 264 is linked with an identified PII "$1^{st}$ George Street" 268 by linkage "located at" 270, and the identified PII "John Smith" 262 is linked with an identified PII "john.smith@dathean.io" 272 by linkage "has email" 274.

Figure 3:
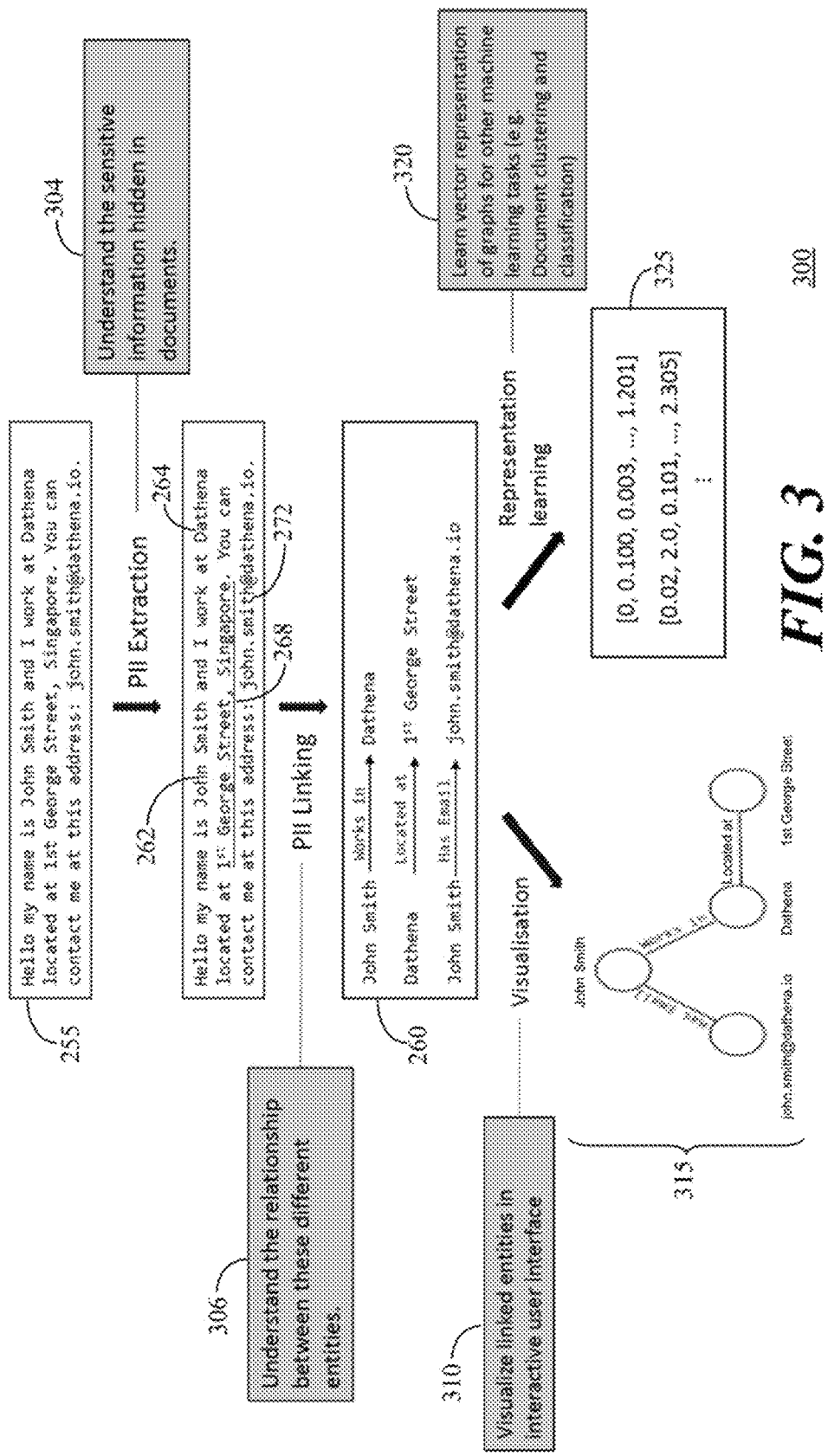
FIG. 3 depicts a high-level illustration of a system architecture for personal information extraction, linkage and purpose of processing prediction in accordance with the present embodiments.

According to another aspect of the present invention, an entity recognition engine for more than fifty types of personal data extraction is provided. The personal data linking 120 is developed to find the relationships between data types and link them to the person. The processing classification process 124 is configured to predict one or more purposes based on context and content features of the context of the documents, which contain PII. Referring to FIG. 3, a high-level illustration 300 in accordance with the present embodiments ingests 104 text 255. The personal data (PII) extraction 118 processes the text 255 to understand the sensitive information hidden in the documents 304. The PII extraction 118 identifies sensitive information such as names (e.g., "John Smith" 262), company names (e.g., "Dathena" 264), addresses (e.g., "$1^{st}$ George Street" 268), and email addresses (e.g., "john.smith@dathean.io" 272).

The personal data linking 120 processes the extracted personal data 262, 264, 268, 272 and the text 255 to understand the relationship between these different entities 306 as shown in the PII linking 260. Then, for the purposes of processing prediction 124, in accordance with the present embodiments, visualization 310 of the PII extraction and linking can visualize the linked entities 262, 264, 268, 272 in an interactive user interface 315 or representation learning 320 can learn vector representation of graphs 325 for other machine learning tasks such as document clustering and classification.

In accordance with an aspect of the present embodiments, a system and methodology was designed for both English and German text in documents in the data pool 102 (FIG. 1). As the documents are free text documents, the methodology in accordance with the present embodiments needs to be able to address the following challenges: some grammatical rules could be missed; punctuation in the documents could be wrong; there may be a similarity or an equality between numerical fields such as phone numbers and passport numbers where, for some countries, the number of digits may be similar; some documents may include spaces or hyphens inside of phone numbers or other numbers (e.g., US Social Security numbers) where in other documents no spaces or hyphens are included; in the German language, all nouns are uppercased, so alphabetic case cannot be used as a distinguishing feature; in German, depending on tense, a verb may be put at the end of the sentence, making it difficult to use word location as a context feature; and addresses have a high variety of formats (though the interest in address for PII extraction issues, is not the general portions of an address like city or country, but only the specific location portions of the address—making personal data extraction of sensitive address information difficult).

Figure 4:
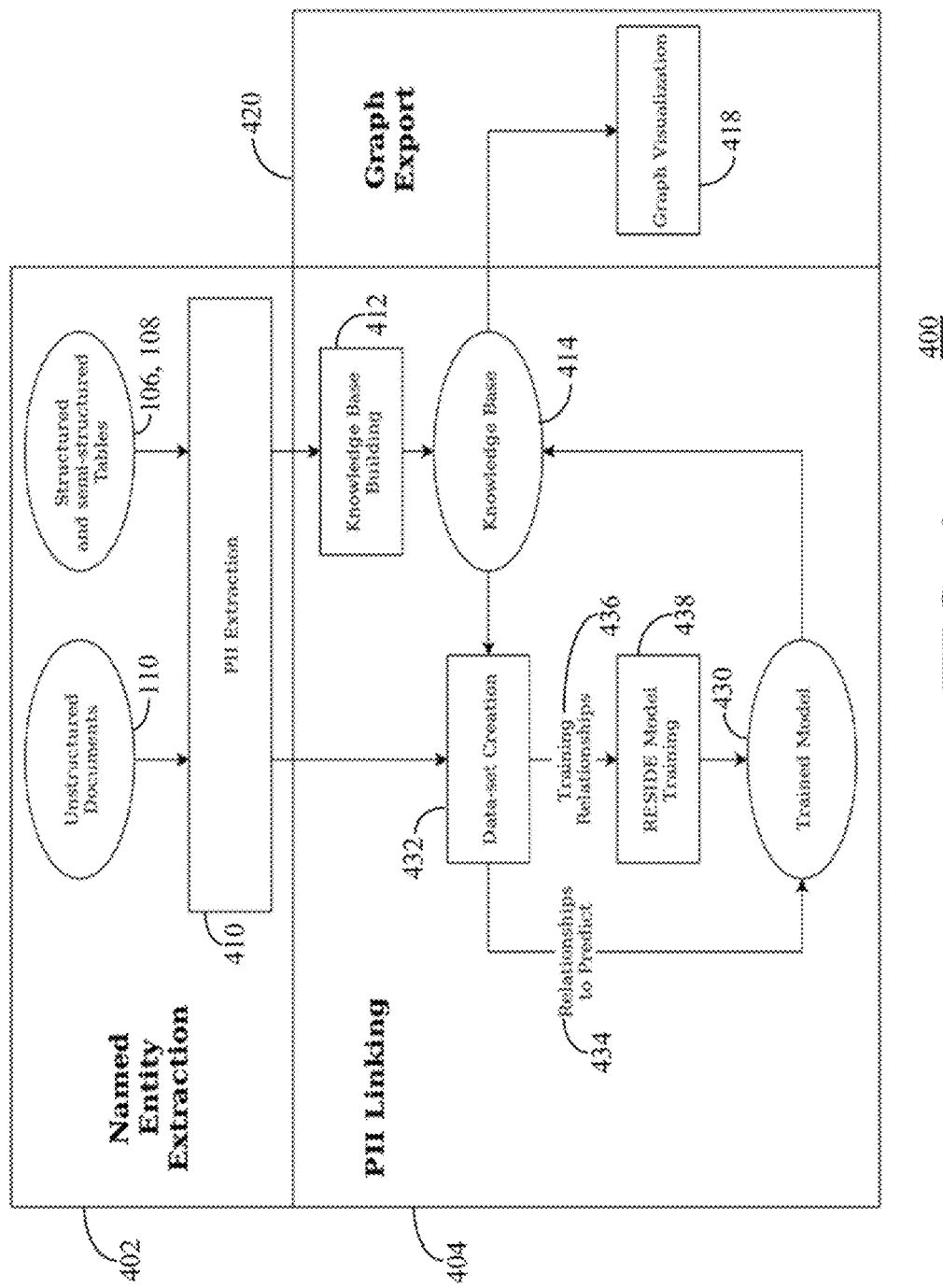
FIG. 4 depicts a block diagram of the named entity extraction and PII linking in accordance with an aspect of the present embodiments.

Referring to FIG. 4, a block diagram 400 depicts named entity extraction 402 and PII linking 404 in accordance with the present embodiments. In regards to named entity extraction 402, unstructured documents 110 and structured and semi-structured tables are ingested into a PII extraction module 410. The PII extraction module 410 utilizes a number of methodologies for personal data extraction from the documents 110, 106, 108. In accordance with an aspect of the present embodiments, pattern matching systems are utilized for static personal data type extraction like phone numbers, credit card numbers, and IP addresses and deterministic modelling methodologies are used for entity recognition and probability calculations. For dynamic personal data entity extraction, deep learning models (e.g., Bidirectional Long-Short Term Memory (Bi-LSTM) networks) are trained on labeled data and used for prediction in real-time. The PII extraction 410 includes, in accordance with present embodiments, transforming text into numerical vectors by using word embedding techniques. For each word, these vectors are concatenated and fed to the deep learning models and then finally output to the PII linking 404.

In accordance with one exemplary embodiment, all personal data types are marked with their type and other non-relevant words are marked as "0". The extracted features of each word are fed into a forward LSTM network and a backward LSTM network. The output of each network at each time step is for each tag category and these two vectors are added together to produce the final output. Inside the LSTM network, a probability for each word is calculated as to how probable the word is a named entity or not. The LSTM network takes into account different features of each word, such as the part of speech of the current word and other words to the left and right of the word, a grammatical object, a tense of a verb, and punctuation.

The named entity extraction 402 uses named entity recognition (NER) models which are trained per each language separately based on specific training datasets. In this manner, different grammatical rules, sentence structures, titles and other rules and structures will impact entity prediction differently for each language.

After structured and semi-structured tables 106, 108 are processed by the PII extraction module 410, semantic information is linked in the PII linking 404 by building 412 a knowledge base 414 and using graph mining on a knowledge graph in the knowledge base 414. Structured documents like excel, csv, odt allow us to extract personal data types and link them based on the value coordinates (i.e., row and column in a spreadsheet). In accordance with the present embodiments, column names are used to predict data type in the column cells by selecting only a few values from a column instead off all of them. The tables found in structured and semi-structured documents go through the PII extraction pipeline, where the column name and the content are used to detect PIIS. For example, if one column is named "employee" and only contains strings of characters, then the whole column will be extracted as a person's names. After the PII extraction, the PIIS that appear in the same row of a table can be linked together to create the knowledge base 414. This helps to reduce time and cost and get the same or greater accuracy of extraction.

Figure 5:
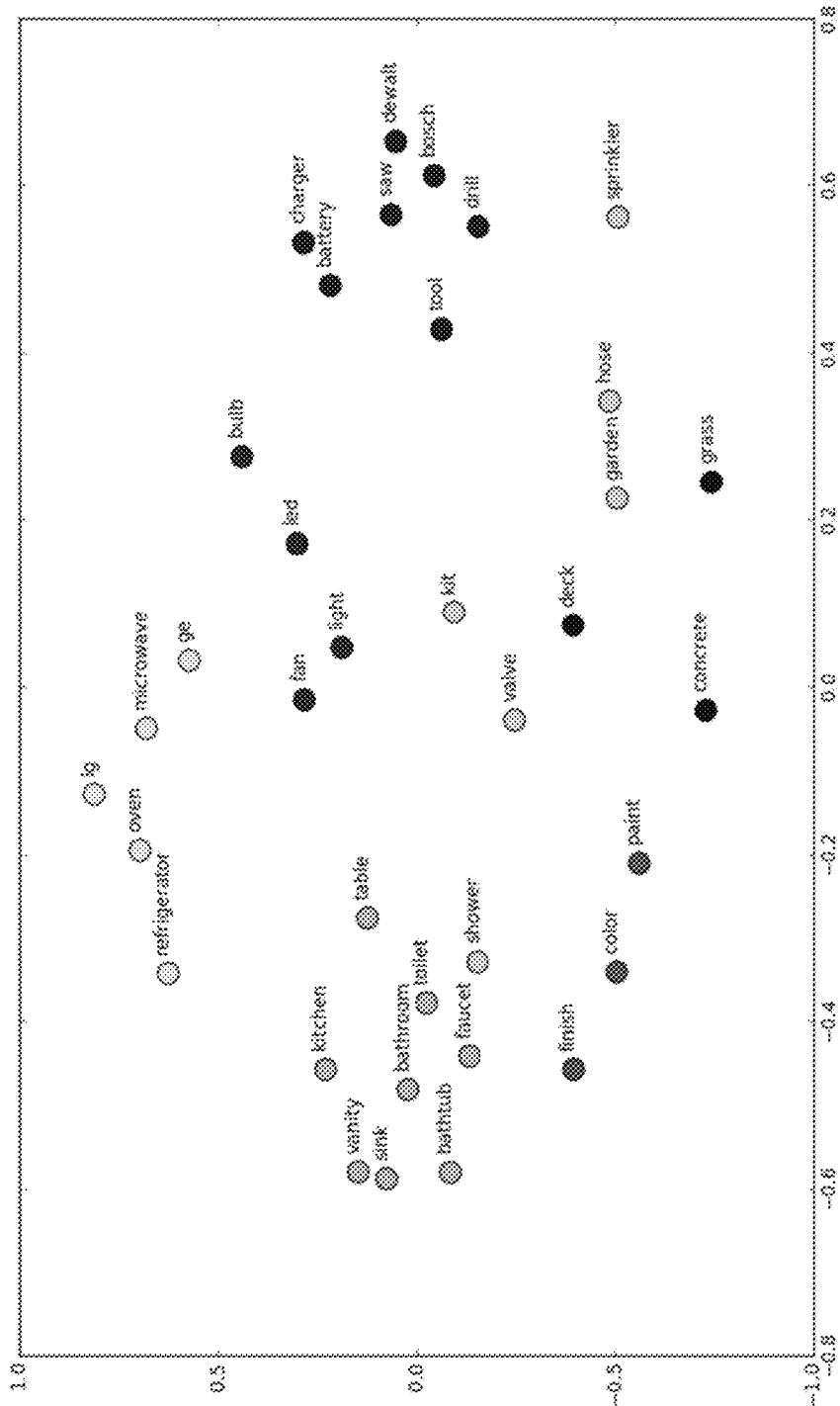
FIG. 5 depicts a knowledge graph clustering linked named entities in accordance with the present embodiments.

Referring to FIG. 5, an exemplary knowledge graph 500 depicts linked named entities clustered in the graph 500 in accordance with a relationship between the linked named entities. The graph 500 can be a graph visualization 418 presented by a graph export module 420 for visualization of the graph-based techniques 122 used for PII linking 404. The graph export module 420 can be used to visualize the relationship between each PII. One example of such graph is the graph 500. The graph can have multiple purposes. One of them involves showing the user which documents contain private information. Having these profiles allows the user to change the access rights of document that contain too many links between PIIS. Another purpose of this graph is to use it as a feature of document classification/clustering. Methods such as graph2vec can be used to create an embedding of the graphs. In accordance with an aspect of the present embodiments, edges can be defined to indicate a semantic relation, while methods precisely allow graph search independently of weights of these edges.

A data set is created by a data-set creation module 432 from the knowledge base 414 and the PII information extracted from the unstructured documents 110 by the PII extraction module 410. Relationships can be predicted 434 from the created data set for building the probabilistic graphical model 430. In addition, relationships can be trained 436 by RESIDE model training 438 for building the probabilistic graphical model 430.

Figure 6:
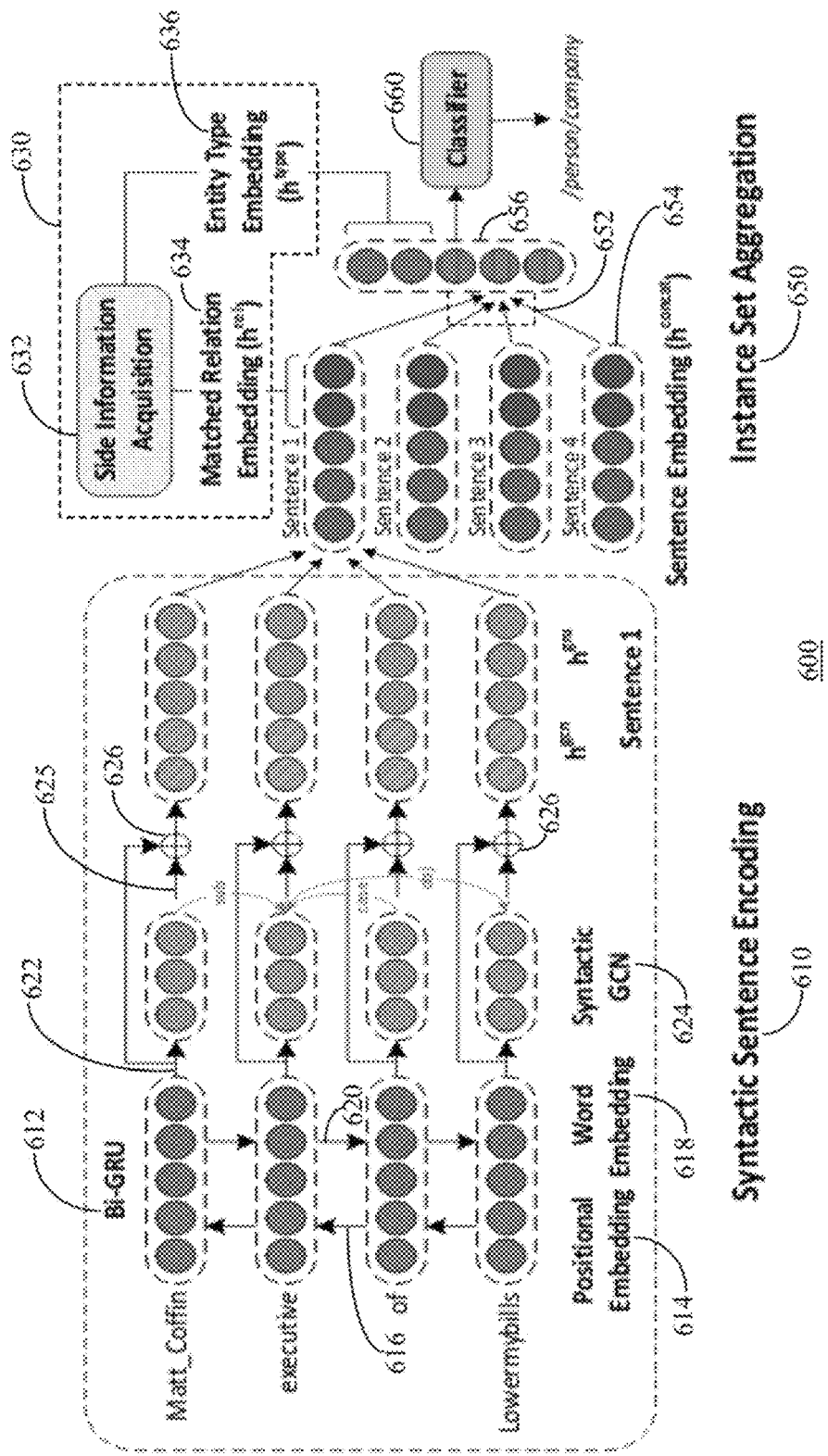
FIG. 6 depicts a schematic illustration of an architecture of RESIDE model training of the PII Linking of FIG. 4 in accordance with the present embodiments.

Referring to FIG. 6, a schematic illustration 600 depicts RESIDE model training 438 in accordance with the present embodiments. RESIDE is a distantly-supervised neural network architecture for relation extraction. In accordance with the present embodiments, it is assumed that if two entities have a relationship in the knowledge base 414, then the documents in the data pool 102 (FIG. 1) include at least one sentence mentioning those two entities and expressing the same relationship. For example, if the knowledge base 414 includes a relationship between "Matt Coffin" and "lowermybill" which links "Matt Coffin" as an "executive of" "lowermybill" then there should be one or more documents in the data pool 102 which have phrases such as "Matt Coffin, executive of lowermybill, a company . . . " or "Matt Coffin works for lowermybill, a company . . . ".

RESIDE acquires side information to improve the results of the classification. Side information is defined as any information that does not come directly from the sentences to predict. Side information can be extracted through a knowledge base or from external methods. Two main types of side information are extracted: an entity type of side information and a relation alias side information. The entity type of side information is based on the fact that some relations can only occur between specific types of entities. For instance, the relation expressed as "live at" can only occur between a person and an address or the relation expressed as or "work in" can only occur between a person and a company.

The relation alias side information utilizes a method to extract relations between target entities. For instance, the relation "Executive of between" "Matt Coffin" and "lowermybill" is extracted in the sentence "Matt Coffin, executive of lowermybill, a company . . . ". Additionally, RESIDE creates a set of relation phrases called P. P contains the phrases that describe the relation between the object and subject entities. P is extended with relation phrases between the tokens that are at one hop distance in the dependency graph from the subject and object. Then, P is further expanded with each paraphrase from a P-to-P database (PPDB).

Referring to the illustration 600, the RESIDE architecture is composed of three general parts: a syntactic sentence encoder 610, side information collection part 630 and Bag of Sentence representation 650. The syntactic sentence encoder 610 uses a Bidirectional-Gate Recurrent Unit (GRU) 612 layer including positional embedding 614 in the first direction 616 and word embedding 618 in the second direction 620 on input sentences and arrays of positions to encode a local context 622 of each token. A Graph Convolution Network (GCN) 624 uses the dependency tree of the sentence to generate an additional embedding 625 to be added 626 to the encoding of the local context 622. Finally, the tokens are sent through an attention layer 628 in order to discard irrelevant tokens and to generate an embedding of the entire sentence.

The side information collection part 630 transforms additionally acquired information 632 to embedding 634, 636 that gets added to the sentence embedding of the previous part. The matched relation embedding 634 is added to each respective sentence.

The Bag of Sentence representation 650 aggregates 652 the sentences 654 together with an attention layer over the sentences. Then, the type embedding side information 636 is added to the bag of sentences encoding 656. The full bag embedding is finally fed to a softmax layer classifier 660 for relation classification which provides the linked entities to the trained model 430 (FIG. 4).

In regards to the PII extraction module 410, PII extraction processing utilized thirteen PII categories as shown in Table 1. Those skilled in the art will realize that there could be more or less PII categories based upon the documents in the data pool 102, the records 106, 108, 110, the desired named entities that could contain sensitive personal data and similar criteria. These categories can be highly sensitive and personal entities from which one can directly derive a person's identity (DIRECT), can be personal entities but not capable of deriving a particular person without further information (INDIRECT Low, Medium and High) and can be a Special category. The Special category only applies to words or named entities where the word/entity has not been categorized in any other categories but still answers to some special requirements. The Special category is defined to avoid missing some personal data that would not be detected by other defined categories. For example, a word or named entity is labelled as "Special" if it contains numbers or if it is composed of between two to five letters all in capital that are not stopwords or currencies.

TABLE 1

| PII | TAG | Category |
| --- | --- | --- |
| First name and last name | <fullname> | Direct |
| Salutation (Mr, Dr, Sir, . . .) and last name | <title_lastname> | Direct |
| Client business relationship | <client_relationship> | Indirect Medium |
| Cash and custody account numbers | <cash_account> or <custody_account> | Direct |
| Passport number | <passport_no> | Direct |
| Global phone number | <phone_no> | Indirect Medium |
| Address | <address> | Indirect High |
| IBAN | <iban> | Direct |
| Portfolio ID | <portfolio_id> | Indirect High |
| Contract number for e-banking | <contract_no> | Direct |
| Credit card number | <credit_card> | Direct |
| Company name | <company_name> | Indirect Medium |
| Special | <special> | Special Category |

While some of the categories are easy to define and determine, a few categories are difficult. For example, passport numbers are hard to define/determine, as they depend on each country standards. Phone numbers should be only numbers with an optional country identification code, and addresses should point to an existing place or location. Finally, MAN codes should be validated to determine that they are correct MAN codes (i.e., a valid MAN code consists of up to 34 alphanumeric characters including a country code, two check digits, a number that includes the domestic bank account number, a branch identifier, and potential routing information.

Figure 7:
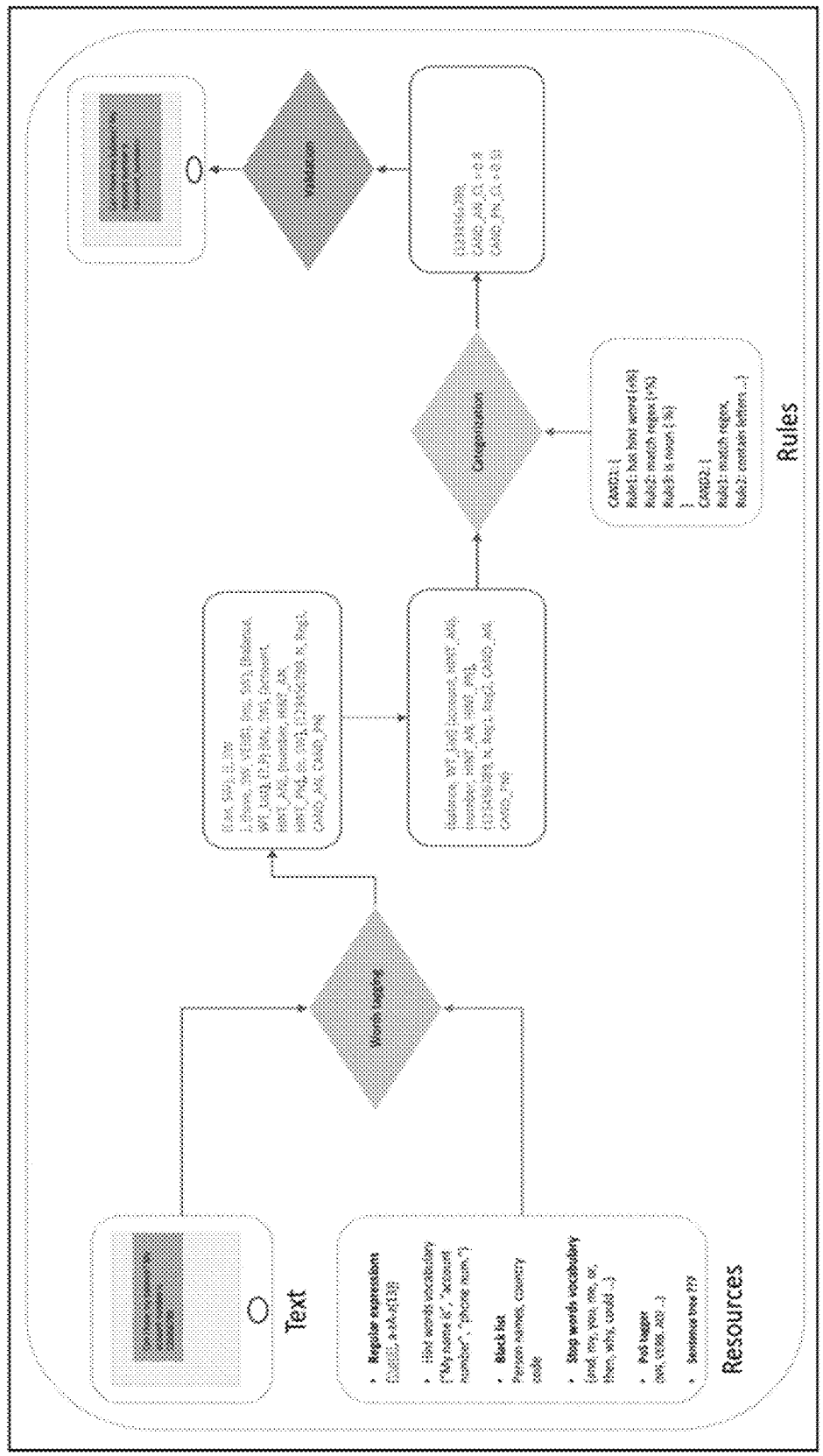
FIG. 7 depicts a flow diagram of PII extraction methodology of the PII Extraction Module of FIG. 4 in accordance with the present embodiments.

Referring to FIG. 7, a flow diagram 700 depicts the PII extraction methodology of the PII extraction module 410 in accordance with the present embodiments. The flow diagram 700 describes a deterministic solution for PII extraction from a user text string entered in real-time. The approach is based on non-machine learning and could be improved by leveraging AI technologies as an additional option. Those skilled in the art will realize that the deterministic solution described in the flow diagram 700 is one may to implement the PII extraction in accordance with the present embodiments and that other PII extraction methodologies can be implemented with or without machine learning and with or without artificial intelligence in accordance with the present embodiments.

A plurality of resources 702 includes identification information for regular expressions 704 (i.e., regexes), hint words vocabulary 706 (e.g., "my name is", "account number" and "phone number"), a black list 708 (e.g., person's name, country code), stop words vocabulary 710 (e.g., "and", "my", "you", "me", "or", "then", "why", "could") part of speech (PoS) tagger 712 (e.g., NN, VERB, ADJ), and sentence tree 714. Other resources and be added for additional identification information. When text 720 such as "Can I have my balance? My account number is 123456789" is received, word tagging 725 tags each of the words/phrases/identifying information in the text 720 using the resources 702, resulting in the tagged words 726. Removing the stop words form the tagged words 726 results in the words 728 (i.e., "balance", "account" and "123456789"). These words 728 are categorized 730 using predefined rules 735 resulting in the account number "123456789" being identified 738 as sensitive personal identifying information (PII). Once validated 740 as PII, the account number is stored elsewhere and masked with <account_number> in the output text 745 "Can I have my balance? My account number is <account_number>". In this manner, the PII extraction 410 provides higher protection to sensitive personal identifying information to meet or provide greater protection that various regulations and internal requirements.

Figure 8:
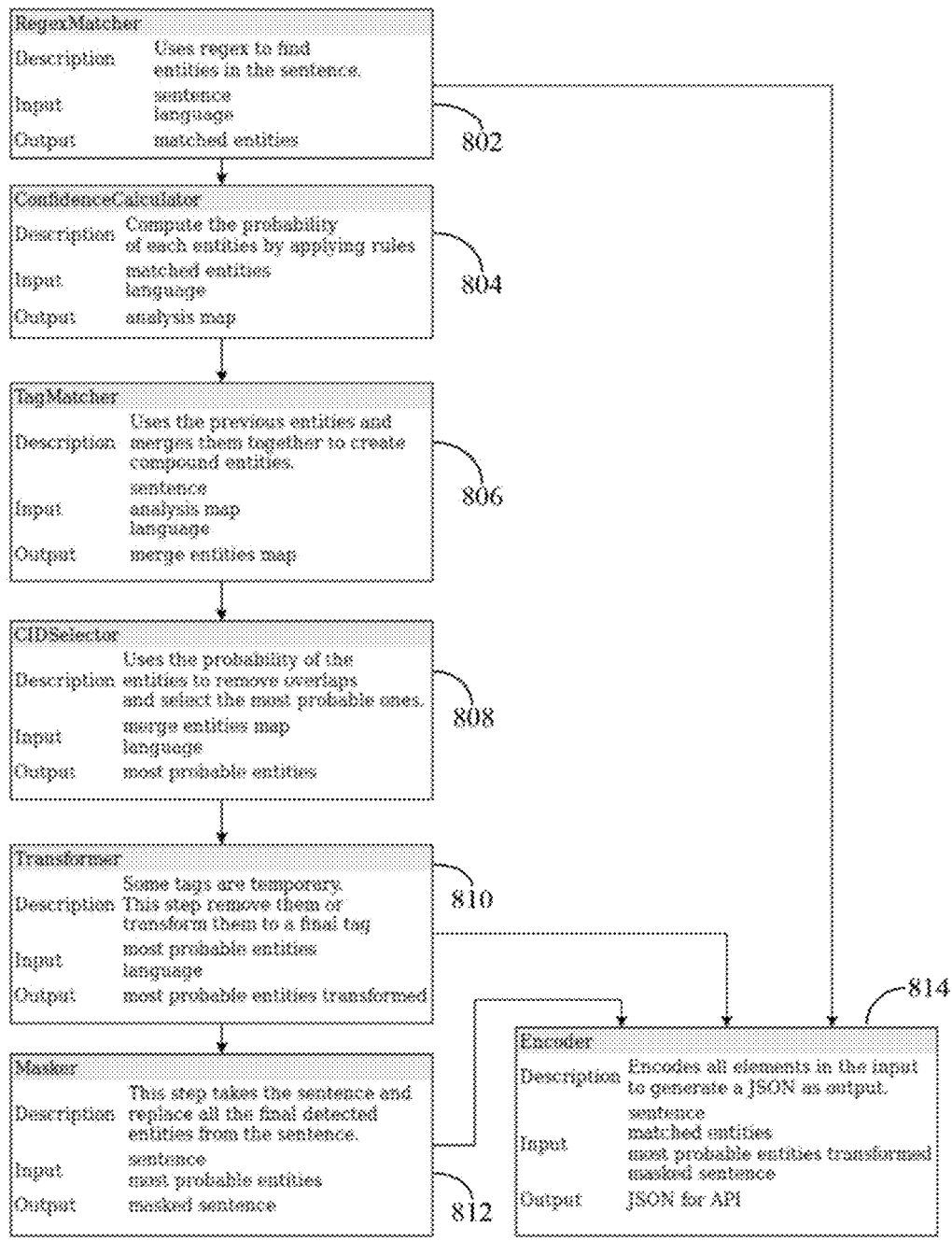
FIG. 8 depicts a block diagram of a pipeline of operational modules of the PII extraction methodology of FIG. 7 in accordance with an aspect of the present embodiments.

Referring to FIG. 8, a block diagram 800 depicts exemplary pipeline of operational modules of the PII extraction methodology of the flow diagram 700 in accordance with the present embodiments. The PII extraction methodology enabled by the pipeline of FIG. 8 utilizes regexes (i.e., a sequence of characters defining a search pattern used by algorithms in "find" or "find and replace" operations) and the modules are designed for such regexes. A RegexMatcher module 802 uses regexes to find named entities in inputted sentence language. The regexes 704 can be predefined regexes for document handling systems and/or may include regexes created specifically for the PII extraction methodology, such as client relationship number, cash account number, or custody account number. Some examples of defined regexes (regular expressions) particular to the PII extraction in accordance with the present embodiments can be found in a table 900 in FIG. 9.

For some regexes to detect names, an efficient regex is created from a list of words. Since the pipeline is deterministic, it is beneficial to leverage as much information as possible in order to detect PIIS accurately. This information may be contained in any words in a sentence. For example, knowing that a word is a country may help find an address. Or, when working with names, if a suspected name is preceded by "My name is", then the suspected information is almost surely a name. Since the regexes are not only used to detect PIIS but also to detect more general things, in accordance with the present embodiments, tags are associated with some or all of the regexes. A tag can be any regex; however, the term 'tag' may also refer to a PII.

As the principal goal is to mask the input sentence as seen at step 745 (FIG. 7), the words matched by regexes may need to be masked. However, only storing the words matched by regexes may not be enough, as the same word may appear multiple times in a sentence, and each appearance of the word may need to be differentiated from others since the different appearances of the word may correspond to different PIIS because not only the word, but the context of the word usage is taken into account to determine a PII. So, instead of storing only the words, the words and their starting and ending location in the input sentence are stored. This advantageously facilitates masking the sentence at step 745 as the location of words to be masked will be stored with the words.

As a first step towards the extraction of the PIIS, all the regexes 704 are applied to the input sentence 720 by the word tagging 725. What is obtained is a list which contains all matches (represented as start and end locations in the sentence) together with the tag corresponding to the regex that matched the word. An example of such a list, with the input sentence "I am Mr. Tree" is shown in a table 1000 in FIG. 10. From the table 1000, it can be observed that sometimes the same range is mapped to different tags, which means that a same word could be different PIIS. It can also be observed that sometimes ranges overlap and might be mapped to different tags. For example, this can happen for a cash account, whose first part is a client relationship and will thus be detected as such.

The last task completed by the RegexMatcher module 802 is the grouping of the words. To convert the previous output into a format that can be handled easily, the RegexMatcher module 802 maps each word with the list of all tags that matched it. Taking the list in the table 1000, the output after grouping is seen in a table 1100 in FIG. 11 which associates all the possible tags to each match. The output of the RegexMatcher module 802 is input to the next module, a ConfidenceCalculator module 804.

In order to extract and select PIIS in a text, the PIIS are categorized 730. For categorization, the ConfidenceCalculator module 804 determines a level of confidence for each possible PII which will later be used for a selection process. In accordance with the present embodiments, a rule-based approach is used to compute the confidence levels (i.e., using the rules 735 (FIG. 7)).

The rule-based approach defines a confidence level for the various matches by updating several times the confidence using manually crafted rules 735. The rules 735 are conditions applied to the word that was matched, or sometimes also to the neighborhood of the word. Indeed, sometimes the context is important in order to determine which of the possible PIIS is the correct one.

In accordance with the present embodiments, a confidence score is defined as a probability, that is a number in the interval [0, 1]. Next, for each verified rule the score is updated. As the confidence level to stay within the bounds, the update must be a number between −1.0 and 1.0 (since the confidence score can increase or decrease). The formula to update the confidence score can be found in Equation (1):

$$score_0 = 0 \qquad (1)$$
$$score^t = \begin{cases} score^{t-1} + (1 - score^{t-1})p, & \text{if } p \geq 0 \\ score^{t-1} + score^{t-1}p, & \text{if } p < 0 \end{cases}$$

where, p is the score update for the rule being applied, and t is the index of the rule. Using this updating scheme and the formula of Equation (1), the confidence score when updated will stay within the bounds of 0 and 1.0. Also, the closer the score is to a bound, the less the update has an effect as it merely pushes the score even closer to this bound.

As mentioned before, the rules 735 can be represented by two things: a condition to be verified and a probability update for the confidence score. The condition to check is based on the word that has been matched and the whole sentence analyzed (that is the version of the sentence after the RegexMatcher module 802, with the tags detected) in order to use all possible information; not only words, but also the potential tags of the words in the sentence.

There is no limit on the number of rules, however limiting the number of rules makes the process more efficient. So, in accordance with the present embodiments, the number of rules are limited to a dozen or so that can be tuned by the user depending on what is attempting to be detected in the text. The following types of rules are examples: (i) given a list of tags and a probability update: update the confidence level of a word if it has been detected as one of the given tags; or (ii) given a character, an upper bound and a probability update: update the confidence level of a word if the number of times the given character appears in the word is smaller than the given bound Following are exemplary rules for various PIIS. Telephone number rules: (i) check words around a possible telephone number; if there are words like "phone", "mobile", "contact", "number", increase the confidence level; (ii) if there are too many digits for a telephone number, decrease the confidence level; (iii) if there are too many spaces, decrease the confidence level; and (iv) if there are letters included, decrease the confidence level. Passport number rules: (i) check words around a possible passport number, if there are words like "passport", increase the confidence level; and (ii) if there are too many letters, decrease the confidence level. Name rules: (i) check words around, if there are words like "name" or "I am", increase the confidence level; (ii) if there are numbers included, decrease the confidence level; and (iii) if the part of speech (PoS) tag of the matched word corresponds to a proper noun, increase the confidence level. International Bank Account Number (IBAN) rule: check words around, if there are words like "IBAN", increase the confidence level. These rules can be applied to each tag of each matched word, using the update formula of Equation (1).

After the application of the set of rules for each match by the ConfidenceCalculator module 804, the output for the example "I am Mr. Tree" is shown in table 1200 in FIG. 12. The computation of the confidence score in accordance with the present embodiments advantageously enables refining detection of PIIS since the confidence score is new information that can be used to perform better detection, by merging adjacent words if such merging makes sense. Such merging is the responsibility of a TagMatcher module 806.

The TagMatcher module 806 enables grouping multiple elements together as a single entity in order to detect compound entities. For example, an address can be defined as the combination of a number, multiple nouns and a city. The TagMatcher module 806 also solves another problem: since the required output makes use of the masks <full-name> and <title_lastname>, two names can be grouped together to create a tag <fullname> from a combination of <first_name> and <last_name>. The algorithm proceeds in two steps: first, a words graph is built to keep track, for each word, all of its successors and, second, the graph is used to efficiently match patterns of tags that are given. When a match is found, the new entity is added to the list of possible PIIS. This new entity will have a confidence level itself, computed by applying the rules for its detected category.

Referring to FIGS. 13A, 13B and 13C, tables 1300, 1330 and 1360 show the categorized entities at various steps in the algorithm of the TagMatcher module 806 in accordance with the present embodiments. The table 1300 includes categorized entities as input to the TagMatcher module 806 from the ConfidenceCalculator module 804.

The table 1330 depicts a word graph of categorized entities built by the TagMatcher module 806. The goal in building the words graph is to find a successor for each word. For example, in order to find a successor for a word w1, the end location of w1 in the sentence is located and the next word(s) from there are found (note the use of the plural here, since different matched words can start at the same location). All the words that have the found beginning index are defined as successors to w1 as depicted in the table 1330 of the word graph which maps a list of successors for each word.

The table 1360 includes matched entities where patterns of tags are used to match the entities in accordance with the second part of the algorithm discussed above. The goal is to merge tags together to find new ones, and this merging is based on patterns that can be defined using the simplified regex syntax described before. The pattern matching is defined as a recursive function with two logical steps: a PatternStep( ) which moves a step forward in the position of the pattern being matched and a WordGraphStep( ) which moves a step forward in the word graph. Multiple paths might be followed since there might be multiple successors. The main behavior of the recursive function is (a) if the pattern has been matched, processing goes one step deeper in the recursion in the two functions; (b) if the pattern is fully matched, a new entity is created with the tag defined in the merge rule; and (c) if the pattern does not match at any step, the recursion is stopped for that path and pattern. The list of the new entities that were added with the merging step are shown in the table 1360.

Note in the table 1360 that some tags are present multiple times with distinct probabilities. There are two reasons for that: the first reason is because the algorithm follows different paths in the successor graph and the second reason is that there can be multiple patterns per tag that match at the same time. In the table 1360, we the most probable tag is <title_lastname> and it will be the one selected by the system.

The output of the TagMatcher module 806 is provided to an input of a PII Selector module 808 which performs the selection of PIIS now that confidence levels have been computed. The process of PII section includes multiple steps which iteratively select only the "best" matches to be masked. First, for each match, only the PII which has the highest confidence level is retained. Second, matches with scores below a predefined threshold are filtered out. And, third, since it is possible that some matches may overlap, only one of the overlapped matches needs to be masked. The challenge is that the probability and length of the PIIS needs to be taken into account. For example, a small highly probable address can be included in a longer address which has a lower confidence score. In this case, it would be preferable to mask the longer address. To solve these cases, the PIIS are decomposed to select the overlapping entities based on the following score formula of Equation (2):

$$\text{score}(w) = \text{harmonicMean}(\text{ratioLength}(w), \text{confidential}(w)) \quad (2)$$

where ratioLength(w) is defined by Equation (3):

$$\text{ratioLength}(w) = \frac{\text{length}(w)}{\max_{w_{max} \in \text{all overlapping words}} \text{length}(w_{max})} \quad (3)$$

Referring to FIGS. 14A, 14B, 14C, 14D and 14E, tables 1400, 1420, 1440, 1460, 1480 depict an example of how the selection process would be made for the sentence: "My name is Davide Smith and my phone number is 6741 4587". The table 1400 depicts PIIS as tagged by the TagMatcher module 806. At step 1 of the PII selection process, the PII selector module 808 only retains the PIIS which have the highest confidence level as shown in the table 1420. At step 2, matches below a predefined threshold are filtered out. The table 1440 depicts the filtering out of matches below a predefined threshold of 0.5. At step 3, scores are computed when there are overlaps to make decisions of the PIIS to select for of the overlapping PIIS as shown in the table 1460. And at step 4, overlaps are removed by selecting the entities in an order of their scores as shown in the table 1480.

A transformer module 810 is coupled to the PII selector module 808 to remove or transform unnecessary tags in accordance with the an aspect of the present embodiments. At the very beginning of the process, in the RegexMatcher module 802, the concept of tags was introduced and it was mentioned how a lot of tags, even though they are not PII directly, can help detect PIIS. However, in some cases, it is possible that some tags have a high enough confidence score that they make their way through the PII selector module 808. For example, the tag defined as <proper_noun>, if found at this point, will indicate dealing with a name. In this case, it is useful to transform the tag to a PII that can then be masked. Another problem that can rise is that the added tags may now not be useful at all. For example, a <title> alone will not bring any useful information. That is why the transformer module 810 is used to remove such unnecessary tags. The output of the transformer module 810 consists of a list of words to be masked, together with their detected PIIS.

A masker module 812 masks the sentence. The words to be masked are represented as ranges (starting and ending locations in the original input text) which is a tremendous help to the masker module 812. If a word appears twice in the text, for example, the masker module 812 will only replace the correct one specified by the range. A difficulty encountered by the masker module 812 is that as the sentence is masked, the length of the sentence will change. So, it is necessary to start the masking at the end of the sentence. As long as there are matches to be masked, the masker module 812 starts from the match whose range is the biggest and changes it to its mask. This way, the masker module 812 assures that when considering a new match, the range will still be correct since the words that were already masked in the sentence come after the words to be masked.

An encoder module 814 receives output from the Regex-Matcher module 802, the transformer module 810 and the masker module 812. The encoder module 814 takes care of the link between the back-end and the API and its goal is, given the JavaScript Object Notation (JSON) request, to retrieve the information needed to run the operational modules of the pipeline of FIG. 8 with the right parameters (language, . . . ), and then encode the output to match the desired JSON format.

Processing of all the operational modules of the pipeline of FIG. 8 enables masking the PIIS of an input text. Referring to FIG. 15, a table 1500 depicts an exemplary input 1502 and its output 1504 produced by the operational modules.

Figure 16:
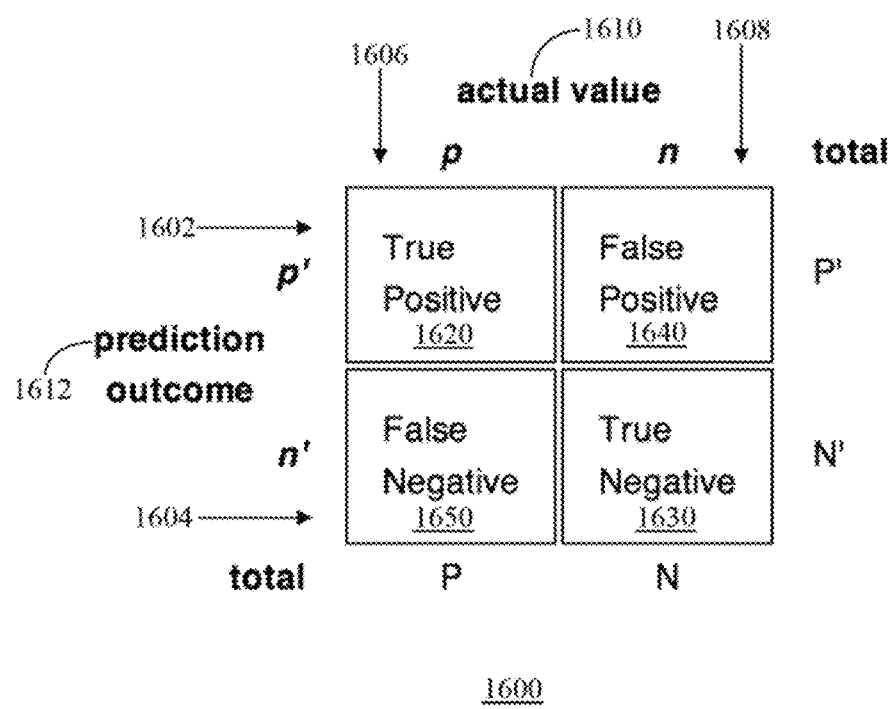
FIG. 16 depicts a confusion matrix for F1 scoring in accordance with the present embodiments.

In regards to evaluation metrics, a F1 score was selected as a statistical measurement to score the predicted results. To introduce the formula for F1 scoring, FIG. 16 depicts a confusion matrix 1600 which has two rows 1602, 1604 and two columns 1606, 1608 and is used for binary classification. Across the top of the matrix 1600 is observed class labels 1610 (e.g., actual values) and down the side of the matrix are the predicted class labels 1612 (e.g., prediction outcome). Each cell contains the number of predictions made by the classifier that fall into that cell. These predictions can be a True Positive (TP) 1620, a True Negative (TN) 1630, a False Positive (FP) 1640 and a False Negative (FN) 1650. The True Positives 1620 are correctly predicted positive values which means that the actual word or sequence of the words is real PII and is also predicted by the model as PII. The True Negatives 1630 are correctly predicted negative values which means that the value is not PII and is also predicted as non-PII by the model. The false positives and false negatives are values which occur when real labels contradict with predicted labels. The False Positives 1640 are values when the word or sequence of the words is not PII, but is predicted by the model as PII. And the False Negatives are values when the word or sequence of the words is PII, but is not captured by the model as PII.

The F1 score is calculated based on Precision and Recall. Precision is the ratio of correctly predicted positive values to the total predicted positive values as shown in Equation (4). Thus, the Precision is how many of the words labeled as PII are actually real PIIS. High precision relates to a low false positive rate.

$$\text{Precision} = TP/TP + FP \qquad (4)$$

Recall (Sensitivity) is the ratio of correctly predicted positive values to all values as shown in Equation (5). Thus, the Recall is how many of the true PII words were labeled as PIIs.

$$\text{Recall} = TP/TP + FN \qquad (5)$$

The F1 Score is the weighted average of Precision and Recall as shown in Equation (6). So, the F1 score takes into account both false positives and false negatives.

$$\text{F1 Score} = 2*(\text{Recall}*\text{Precision})/(\text{Recall}+\text{Precision}) \qquad (6)$$

If focusing on high recall, it is more likely to capture all PIIS among real cases. In such a case, a low percent of False Positives is acceptable where some words are labelled as PIIS, but they are not PIIS.

Synthetically generated samples in both languages were used for solution evaluation and while they are not 100% percent accurate, a higher accuracy may be achievable with human interaction. Table 2 shows Recall, Precision and F1 scores for several fields when operating in accordance with the present embodiments on sentences in the English language.

TABLE 2

| Field | Recall | Precision | F1-score |
|---|---|---|---|
| First name and last name | 87.50 | 73.46 | 79.87 |
| First name | 98.55 | 69.56 | 81.56 |
| Salutation (Mr, Dr, Sir, . . .) and last name | 95.06 | 100.00 | 97.47 |
| Client business relationship | 100.00 | 94.44 | 97.14 |
| Cash account numbers | 98.24 | 94.73 | 96.45 |
| Custody account numbers | 100.00 | 100.00 | 100.00 |
| Portfolio ID | 100.00 | 96.55 | 98.24 |
| Contract number for DATHENA e-banking | 93.65 | 96.03 | 94.83 |
| Global phone number | 93.04 | 84.35 | 88.48 |
| Address | 78.00 | 48.00 | 59.43 |
| IBAN | 100.00 | 100.00 | 100.00 |
| Credit card number | 98.92 | 67.74 | 80.41 |
| Company name | 92.00 | 48.00 | 63.09 |
| Passport Number | 93.18 | 86.36 | 89.64 |
| AVERAGE | 94.87 | 82.80 | 88.42 |

Table 3 shows Recall, Precision and F1 scores for several fields when operating in accordance with the present embodiments on sentences in the German language.

TABLE 3

| Field | Recall | Precision | F1-score |
|---|---|---|---|
| First name and last name | 92.50 | 59.25 | 72.23 |
| First name | 56.00 | 96.43 | 70.85 |
| Salutation (Mr, Dr, Sir, . . .) and last name | 82.05 | 85.90 | 83.93 |
| Client business relationship | 100.00 | 88.88 | 94.11 |
| Cash account numbers | 100.00 | 93.48 | 96.63 |
| Custody account numbers | 98.08 | 100.00 | 99.03 |
| Portfolio ID | 92.68 | 100.00 | 96.20 |
| Contract number for DATHENA e-banking | 83.78 | 94.59 | 88.86 |
| Global phone number | 90.38 | 91.35 | 90.86 |
| Address | 44.00 | 64.00 | 52.15 |
| IBAN | 100.00 | 100.00 | 100.00 |
| Credit card number | 88.00 | 88.00 | 88.00 |
| Company name | 34.00 | 100.00 | 50.75 |
| Passport Number | 100.00 | 54.54 | 70.58 |
| Average | 82.96 | 86.89 | 84.88 |

Figure 17:
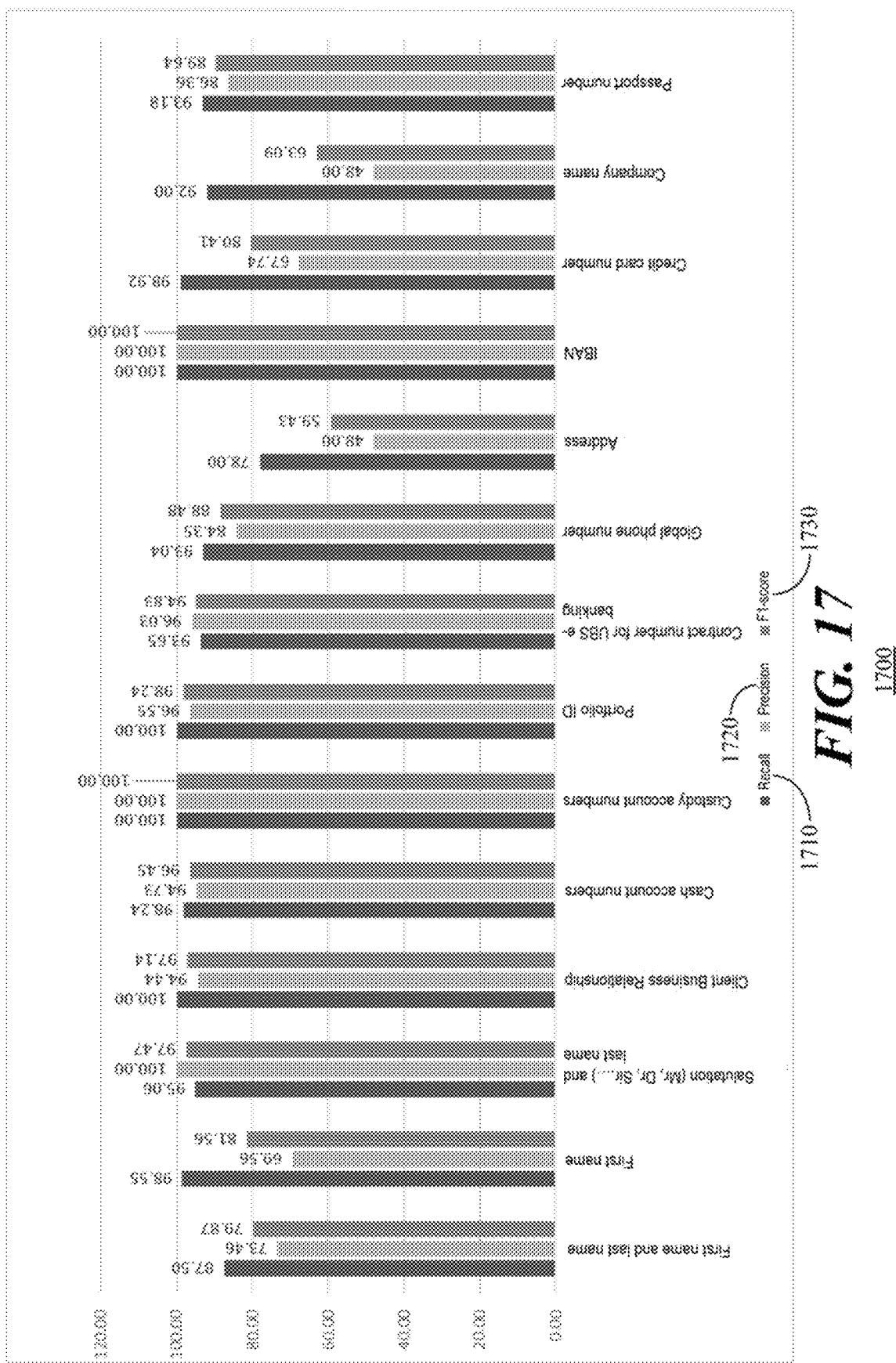
FIG. 17 depicts a bar graph illustrating prediction metrics for each field when performing methodologies in accordance with the present embodiments on sentence in the English language.
Figure 18:
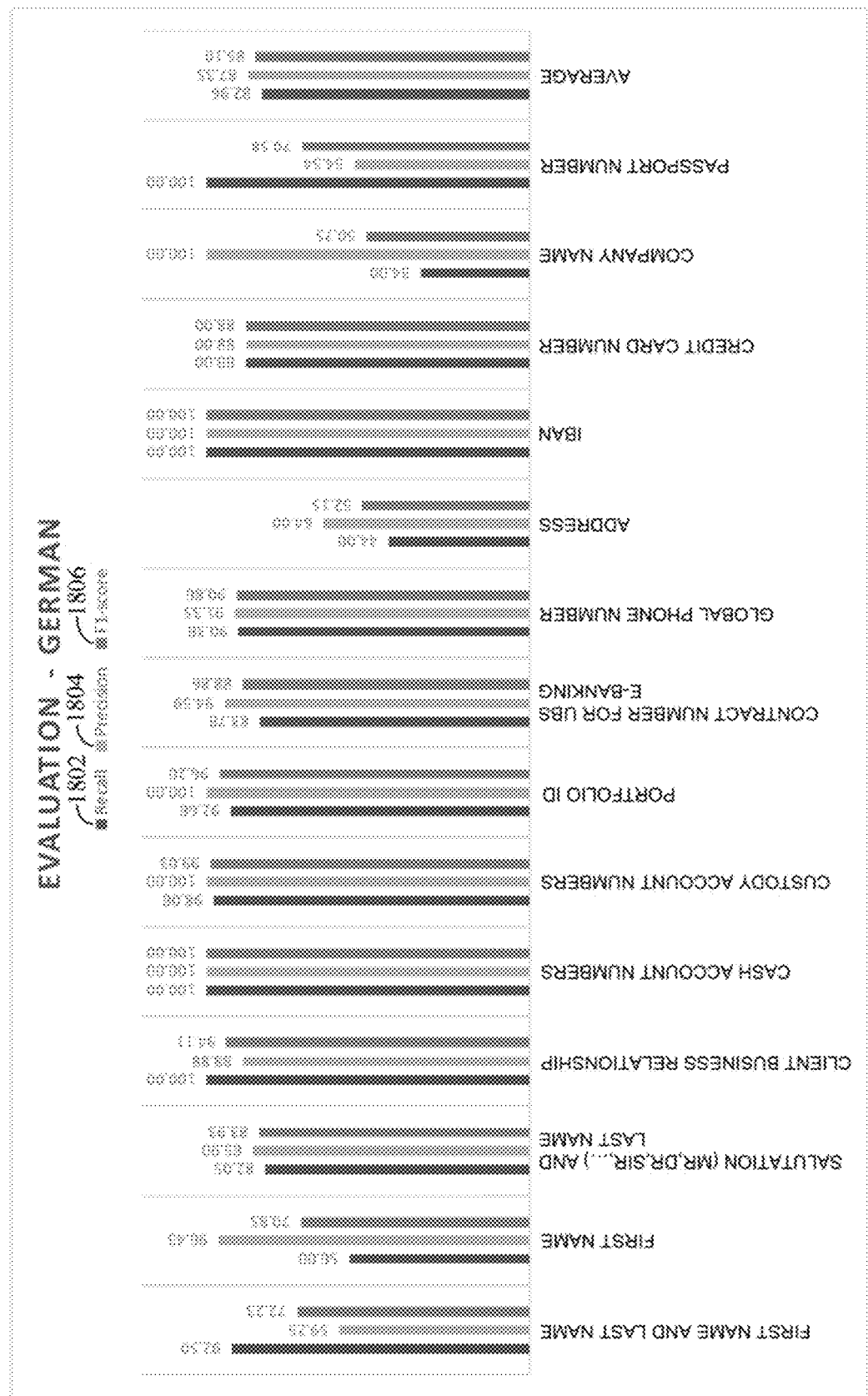
FIG. 18 depicts a bar graph illustrating prediction metrics for each field when performing methodologies in accordance with the present embodiments on sentence in the German language.

Referring to FIG. 17, a bar graph 1700 depicts the difference in prediction metrics (Recall 1710, Precision 1720 and F1 score 1730) for each field separately when operating in accordance with the present embodiments on sentences in the English language. From the bar graph 1700, we can note that the module predicts IBAN and Custody account numbers with a F1 score of 100%, while the F1 score for the address field only averages ~65%. Referring to FIG. 18, a bar graph 1800 depicts the difference in prediction metrics (Recall 1810, Precision 1820 and F1 score 1830) for each field separately when operating in accordance with the present embodiments on sentences in the German language.

Figure 19A:
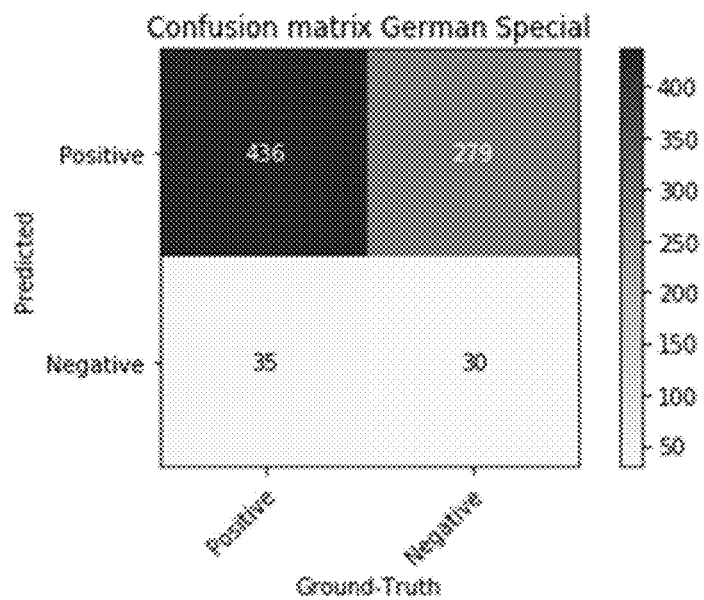
Figure 19B:
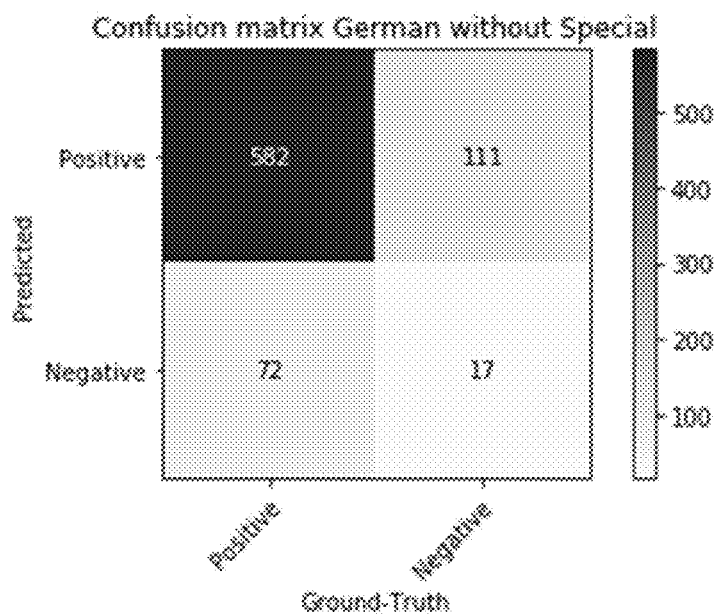

Referring to FIGS. 19A and 19B, confusion matrices 1900, 1950 depict F1 scoring when performing methodologies in accordance with the present embodiments on sentences in the German language. The confusion matrix 1900 depicts F1 scoring when the PIIS include a special category and the confusion matrix 1950 depicts F1 scoring when the PIIS do not include a special category.

Figure 20A:
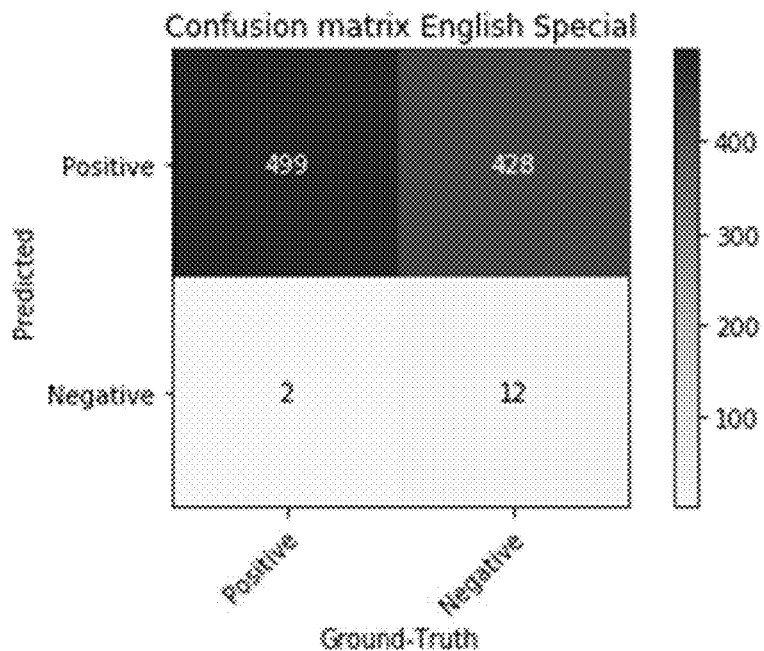
Figure 20B:
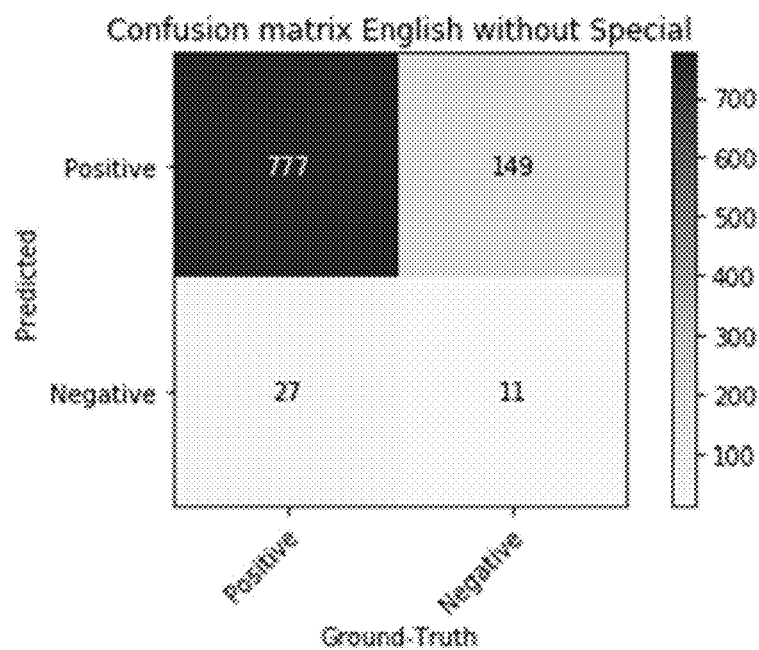

Referring to FIGS. 20A and 20B, confusion matrices 2000, 2050 depict F1 scoring when performing methodologies in accordance with the present embodiments on sentences in the English language. The confusion matrix 2000 depicts F1 scoring when the PIIS include a special category and the confusion matrix 2050 depicts F1 scoring when the PIIS do not include a special category.

Figure 21A:
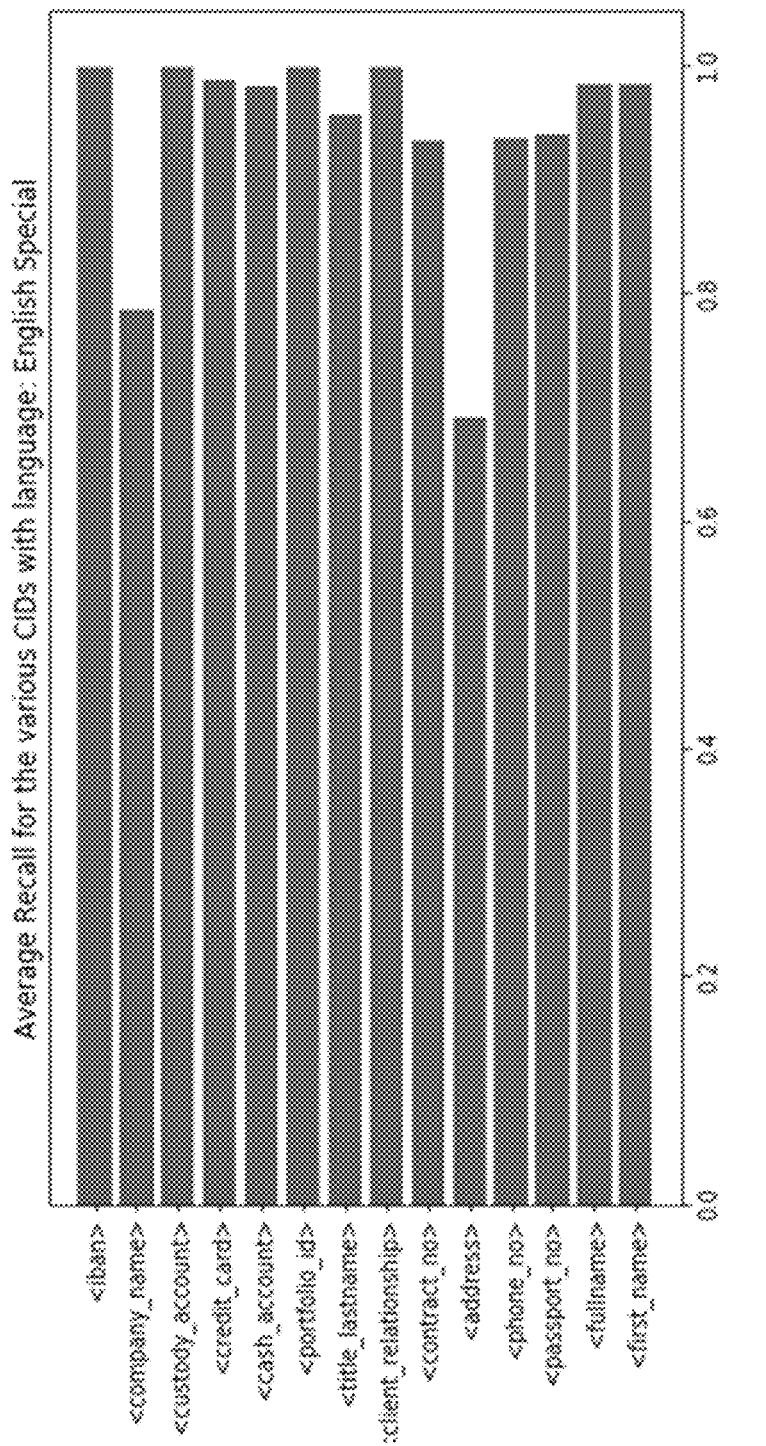
Figure 21B:
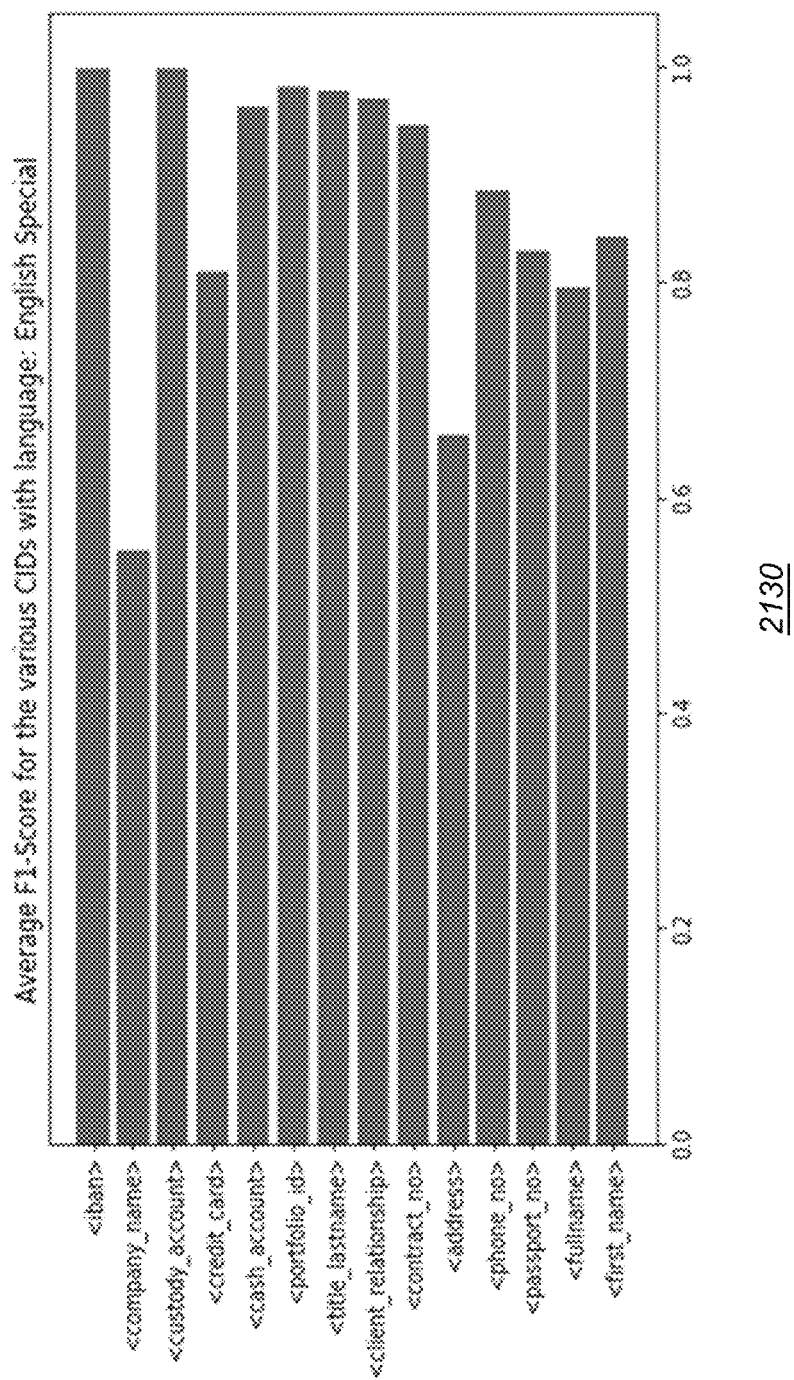
Figure 21C:
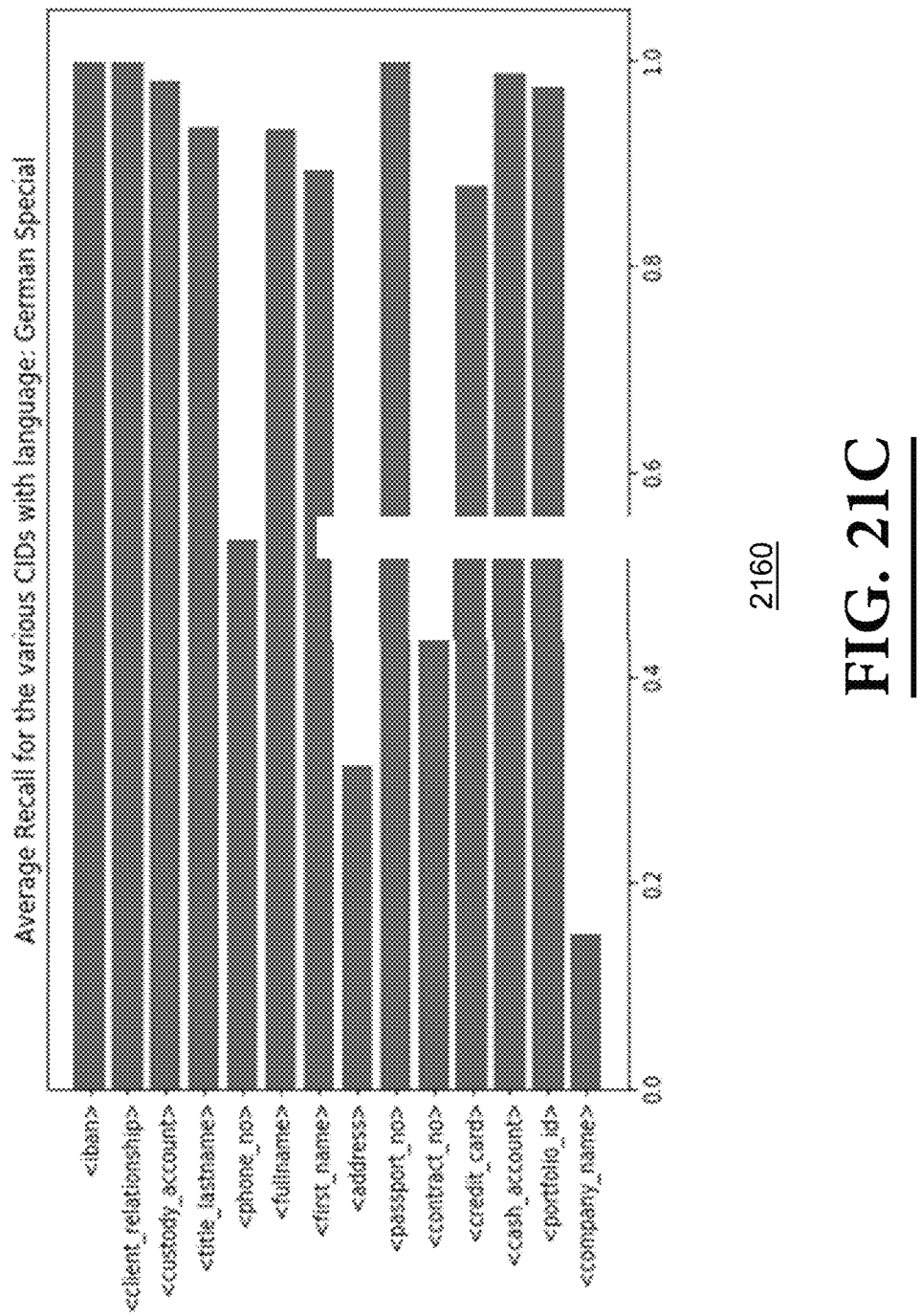

Referring to FIGS. 21A, 21B and 21C, bar graphs 2100, 2130, 2160 illustrate average prediction metrics for each field when performing methodologies in accordance with the present embodiments on sentences. The bar graph 2100 depicts average Recall metrics for fields in the English language. The bar graph 2130 depicts average F1 score metrics for fields in the English language. And the bar graph 2160 depicts average Recall metrics for fields in the German language.

Speed benchmarks are shown in Table 4 where operation in accordance with the present embodiments was done with direct interaction with a backend with no API.

TABLE 4

| Time Elasped (average on 1000 run) | Sentence |
|---|---|
| 5.44 ms | I am Mr. Tree |
| 24.48 ms | My name is Michael Schneider, adn passoprt number is X0824129. |
| | There is a mistake for my infos, my phone Number has changed to 493.920.6216, |
| | I am Russell Graham, my account number is 07387P777234.7SG. |
| 13.79 ms | My name is Adrien Williams and my friend is Robert. His account number is |
| | 12345698 and his phone number is +65 8420 2996 |
| 1.95 ms | Mein name ist Roger und mein Telefonnummer ist +65 4444 444 |
| 1.87 ms | Ich bin Herr Muller |
| 14.57 ms | Mein Name ist Michael Schneider, und die Passoprt-Nummer lautet X0824129. |
| | Es gibt einen Fehler für meine Infos, mein Telefonnummer wurde in 493.920.6216 |
| | geändert. Ich heiße Russell Graham. Meine Kontonummer ist 07387P777234.7SG. |

In addition to Precision, Recall and F1 scoring, metrics for Toxicity and Risk were calculated in accordance with the present embodiments. One of the initial objectives was to attribute a toxicity score to a combination of personal data. The idea is to identify groups of data entities and to attribute them to a person. These data entities can be, for example, an address and a phone number that are relatively close to an extracted person's full name. The toxicity score could be applied as a weighted sum of the weights of all the personal data entities in the combination. The size of the combination can also be taken into account as a normalizing factor or to shift the score as a combination with a larger number of personal data giving more information on the linked person. Toxicity, Risk and Sensitivity measurements help address the compliance problem in several jurisdictions by leveraging statistical measurements and techniques.

The big challenge is in personal data extraction from unstructured and structured documents and databases, its validation and linking to the subject of processing (person, organization). Based on identified personal information, the documents are tagged with sensitivity and risk labels in accordance with the present embodiments and processing is able to predict anomalies related to data sensitivity and access rights.

From the other side, each data processing activity relating to personal data has one or more purposes. Different data processing activities can share one purpose. The solution in accordance with the present embodiments is designed to predict the purpose of the personal data processing through document topic and personal data distribution analysis For each personal data type, we define a category and a toxicity weight. As we have discussed, personal data (PII) means any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. A PII category defines the groups of PIIS, which are linked by the protection needs and correlate with the ability to identify a person directly.

A special category defines the personal data that should be protected with additional means, and should not be collected without explicit consent, good reason or a few other exceptions. Those categories are: racial or ethnic origin, political opinions, religious or philosophical beliefs, trade union membership, genetic data, biometric data, health data, and sex life and sexual orientation.

Toxicity is a measurement which defines a level of occurrences of highly weighted PIIS in the documents/folders/other data. When high weighted PIIS are present in the text a higher Toxicity score is measured. Thus, toxicity, at a document level, represents a severity of an incident from a data privacy point of view.

Each personal datatype is given a category and a weight. There are five different categories based on the possibility that a datatype can identify a person directly or indirectly in addition to a level of sensitivity (e.g., indirect low (weight 1) (academic degree or age), indirect medium (weight 2) (company name, marital status), indirect high (weight 3) (children's name), direct (weight 4) (driver's license number, passport number), special (weight 5) (ethnicity, sexual orientation)). A weight is arbitrarily chosen to reflect the sensitivity of a particular data type, where a high score indicates a sensitive data entity.

The toxicity is first defined at the document level and will then be transposed for other types of objects like folders, departments, locations, or AD Groups. The toxicity, at a document level, represents the severity of an incident from a data privacy point of view. For the first version of the toxicity scoring at the document level, the best metric we have is to apply a weighted sum of all the weights assigned at the individual level as shown in Equation (7).

$$T_d = \Sigma_i p_i \cdot w_i \qquad (7)$$

where $T_d$ is the toxicity of document d; $p_i$ is the number of unique occurrences of the PII number i; and $w_i$ is the weight of the PII number i.

The weights of all extracted data entities with a weight different than 0 are summed together in order to get a toxic score for each document as shown in Table 5 where the toxicity is a normalized weighted sum.

TABLE 5

| PII | Weight | Document 1 | Document 2 | Document 3 | Document 4 | Document 5 |
|---|---|---|---|---|---|---|
| Address | 1 | 1 | | | | |
| Card | 1 | 1 | | | | |

TABLE 5-continued

| PII | Weight | Document 1 | Document 2 | Document 3 | Document 4 | Document 5 |
|---|---|---|---|---|---|---|
| IBAN | 1 | 1 | | | | |
| Country | 0.2 | 0.2 | 0.2 | | | |
| Ethnicity | 0.2 | 0.2 | | | 0.2 | |
| Gender | 0.2 | | | | 0.2 | |
| Localisation | 0.2 | | | | 0.2 | |
| Password | 0.2 | | | | 0.2 | |
| Political Party | 0.2 | | | | 0.2 | |
| Race | 0.2 | | 0.2 | | 0.2 | |
| Religion | 0.2 | | 0.2 | | 0.2 | |
| Role | 0.2 | | 0.2 | | | |
| Sexual Orientation | 0.2 | | 0.2 | | | |
| Academic Degree | 0.1 | 0.1 | 0.1 | | | |
| Date | 0.1 | 0.1 | 0.1 | 0.1 | | 0.1 |
| Website | 0.1 | 0.1 | 0.1 | 0.1 | | 0.1 |

Each organisation can choose how they want to define the toxicity level based on the normalised toxicity. An example is shown in Table 6:

TABLE 6

| Definition | Toxicity Level |
|---|---|
| 0 < Tdn < 0.25 | Low |
| 0.25 < Tdn < 0.5 | Medium |
| 0.5 < Tdn < 0.75 | High |
| 0.75 < Tdn < 1 | Very High | referring to risk, the risk is also first defined at the document level and then is transposed for other types of objects like folders, departments, and locations. The risk, at a document level, represents the combination of the likelihood and the severity of an incident. For a first version, the severity is evaluated by the toxicity and the likelihood by the number of employee having access to the document as shown in Equation (8).

$$R_d = T_d \cdot E_d \quad (8)$$

where the risk $R_d$ of the document d is calculated by multiplying $T_d$ (the toxicity of document d) by $E_d$ (the number of employees that can access document d). For instance, if the toxicity of document d is $T_d=29$ and if 10 employees have access to this document, then $R_d=29 \times 10=290$. Hence, each document will have a risk.

In order to compare risks easily, a normalised risk, Rdn is defined. The normalisation will most probably be done like this:

$$Rdn = Rd/Rd\max \quad (9)$$

This normalised risk will be between 0 and 1 and each document of the organisation will be distributed using their risk as follow:

TABLE 7

| 1.00 | 0.98 | 0.9 | 0.7 | 0.15 | 0.1 |
|---|---|---|---|---|---|

Finally, each organisation can choose how they want to define the risk level based on the normalised risk:

TABLE 8

| Definition | Risk Level |
|---|---|
| 0 < Rdn < 0.25 | Low |
| 0.25 < Rdn < 0.5 | Medium |
| 0.5 < Rdn < 0.75 | High |
| 0.75 < Rdn < 1 | Very High |

The sensitivity of an object (e.g., file, category, department) for a document will be equal to its confidentiality. Sensitivity can be calculated in accordance with Equation (9).

$$S_k = N_s W_s + N_c W_c + N_i W_i \quad (9)$$

where $S_k$ is the sensitivity of an object k; $N_k$ is the number of documents with the confidentiality k; $W_k$ is the weight of confidentiality k; and where the subscripts are s for secret, c for confidential, i for internal, and p for public.

An anomaly detection engine is designed to find the types of anomalies within use access rights, which is related to the toxic documents. An anomaly value is calculated based on risk and represents the documents which have the highest risk in data protection. The documents with "Medium", "High" and "Very high" risk are considered as anomalies and will be sent to experts to review their data protection level. The threshold for anomaly is customizable and can be tuned by the client.

Thus, it can be seen that the present embodiments provide data protection methods and systems for extraction of personal data entities (entity recognition), their classification (entity classification), linking and purpose of the processing definition which is able to address the challenges in meeting personal data protection and privacy regulations. The present methods and systems can mask sensitive data in a company's document repository to limit access to personal identifying information (PII) in compliance with government regulations. Systems and methods in accordance with the present embodiments can identify different categories of PIIS and provide data management of categories individually in relation to user defined category data protection schemes. Further, the systems and methods in accordance with the present embodiments provide a speedy and accurate system for reviewing a large number of documents for personal data extraction and personal data linking. Finally, systems and methods in accordance with the present embodiments can provide toxicity, risk and sensitivity measurements for improved data management of documents which include personal data in compliance with legislation and regulations of various jurisdictions.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A computer-based system for personal data classification comprising:

a plurality of records stored in one or more data repositories in a computer network or cloud infrastructure, wherein the plurality of records comprise structured, semi-structured and unstructured records; and a multi-module processing system comprising:

an entity extraction module configured to extract personal data from the plurality of records in the one or more data repositories in the computer network or cloud infrastructure, wherein the entity extraction module is configured to transform text in the plurality of records into numerical vectors using word embedding techniques and provide the numerical vectors to deep learning models to extract the personal data from the plurality of records;

a linkage module coupled to the entity extraction module and configured to use graph-based methodology to link the personal data to one or more individuals, wherein the graph-based methodology comprises building a knowledge base and using graph mining on a knowledge graph in the knowledge base; and a purpose prediction module coupled to the linkage module and comprising:

a feature extraction module, wherein the feature extraction module is configured to extract both context features and record's features from the records in the one or more data repositories in the computer network or cloud infrastructure, wherein the record's features comprise an extension of the record representing the type of document of the record and a language of the record; and a purpose of processing prediction module configured to predict a unique purpose or multiple purposes of processing of the personal data in response to the context features and the record's features, wherein the purpose prediction module is further configured to use the link of the personal data to the one or more individuals to predict the unique purpose or the multiple purposes of processing of the personal data.

2. The system for personal data classification in accordance with claim 1 further comprising an anomaly detector configured to detect data breaches in response to the predicted purpose of processing the personal data.

3. The system for personal data classification in accordance with claim 1 wherein the entity extraction module is configured to use unsupervised deep learning to extract the personal data from the plurality of records, and wherein the deep learning models to which the numerical vectors are provided by the entity extraction module comprise deterministic learning methodology.

4. The system for personal data classification in accordance with claim 1 wherein the entity extraction module is configured to perform entity recognition to extract more than fifty entity types with their further characterization.

5. The system for personal data classification in accordance with claim 1 wherein the record's features further include user rights, document date and document owner.

6. A computer-implemented method for auto-labelling of personal data comprising:

scanning one or more documents stored in one or more data repositories in a computer network or cloud infrastructure, the one or more documents comprising structured, semi-structured and unstructured documents;

performing entity recognition in the structured, semi-structured and unstructured documents by extracting personal data from the one or more documents, the personal data extracted from the one or more documents by transforming text in the one or more documents into numerical vectors using word embedding techniques and providing the numerical vectors to deep learning models to extract the personal data;

extracting features from the structured, semi-structured and unstructured documents, wherein the features extracted from the structured, semi-structured and unstructured documents comprise metadata extensions and language of the one or more documents; and personal data processing prediction comprising unsupervised auto-labelling of personal data from the one or more documents in the one or more data repositories in the computer network or cloud infrastructure, wherein the unsupervised auto-labelling reuses a text summarization methodology and includes key-phrase aggregation and linking techniques to predict a purpose of processing topic label for the personal data, wherein the unsupervised auto-labelling utilizes linking techniques comprising graph-based methodology to link the personal data to one or more individuals, and wherein utilizing the graph-based methodology comprises:

building a knowledge base; and using graph mining on a knowledge graph in the knowledge base.

7. The computer-implemented method in accordance with claim 6 wherein the extracting features comprises extracting more than fifty entity types and further categorization of personal data in the one or more documents.

8. The computer-implemented method in accordance with claim 6 further comprising:

supervised and unsupervised machine learning model training for identifying relationships between personal data entities in the extracted personal data; and calculating a probability of a linking of the personal data entities based on the identified relationships for the unsupervised auto-labelling of the personal data.

9. The system for personal data classification in accordance with claim 1 further comprising an interactive user interface coupled to the linkage module, wherein the linkage module is further configured to generate one or more visualizations of linkage of the extracted personal data and the one or more individuals, and wherein the interactive user interface is configured to present one or more visualizations of the linkage of the extracted personal data and the one or more individuals for other machine learning tasks such as document clustering and classification.

* * * * *